US008208944B2

(12) United States Patent
Kim et al.

(10) Patent No.: US 8,208,944 B2
(45) Date of Patent: Jun. 26, 2012

(54) DUAL MODE TERMINAL SUPPORTING LOCATION-BASED SERVICES AND CONTROL METHOD FOR THE SAME

(75) Inventors: Ki Hwan Kim, Goyang-si (KR); Seong Jin Park, Anyang-si (KR); Woo Yol Kim, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 12/829,336

(22) Filed: Jul. 1, 2010

(65) Prior Publication Data

US 2011/0003602 A1    Jan. 6, 2011

Related U.S. Application Data

(60) Provisional application No. 61/222,923, filed on Jul. 2, 2009.

(51) Int. Cl.
*H04W 24/00* (2009.01)
(52) U.S. Cl. .................. 455/456.1; 455/457; 455/127.4
(58) Field of Classification Search .................. 455/457, 455/456.1
See application file for complete search history.

(56) References Cited

U.S. PATENT DOCUMENTS

| | | | |
|---|---|---|---|
| 7,412,248 B2* | 8/2008 | McNew et al. | 455/456.1 |
| 7,893,869 B2* | 2/2011 | Gaal et al. | 342/357.21 |
| 2002/0141441 A1 | 10/2002 | Neumann et al. | |
| 2004/0185899 A1* | 9/2004 | Hayem et al. | 455/552.1 |
| 2006/0293066 A1* | 12/2006 | Edge et al. | 455/456.3 |
| 2007/0275658 A1 | 11/2007 | Gaal et al. | |
| 2009/0047979 A1* | 2/2009 | Oh et al. | 455/457 |
| 2009/0146882 A1 | 6/2009 | Halivaara et al. | |
| 2009/0239582 A1 | 9/2009 | Lin | |
| 2009/0253440 A1 | 10/2009 | Edge | |
| 2010/0296419 A1* | 11/2010 | Kim et al. | 370/297 |

OTHER PUBLICATIONS

Gwennap, L., et al., "A Guide to Wireless Handset Processors," Fourth Edition, Jun. 2009, XP-007915608.
Qualcomm Inc., "MSM7200 Chipset Solution," Qualcomm Chipset Solutions, XP-007915609, Nov. 2006.
Wirola, L., et al., "Requirements for the Next Generation Standardized Location Technology Protocol for Location-based Services," Journal of Global Positioning Systems, vol. 7, No. 2, pp. 91-103, 2008, XP-007915620.
"Qualcomm and Huawei to showcase world's first demonstration of MBMS mobile TV technology at 3GSM World Congress," Qualcomm Press Release, Dec. 2011.

* cited by examiner

*Primary Examiner* — Lester Kincaid
*Assistant Examiner* — Isaak R Jama
(74) *Attorney, Agent, or Firm* — Lee, Hong, Degerman, Kang & Waimey

(57) ABSTRACT

A dual mode terminal for providing location-based services is provided. The dual mode terminal includes a first area including a first wireless communication unit for communication with a first communication network and a first processor for processing signals transmitted and received to and from the first communication network, and a second area including a second wireless communication unit for communication with a second communication network and a second processor for processing signals transmitted and received to and from the second communication network. The first wireless communication unit includes a GPS receiver for receiving satellite GPS signals. The first processor includes a GPS engine for processing network location information received from the first communication network and the second communication network, and the second processor transfers network location information received from the second communication network to the first processor.

11 Claims, 22 Drawing Sheets

DUAL MODE TERMINAL SUPPORTING LOCATION-BASED SERVICES AND CONTROL METHOD FOR THE SAME

This application claims the benefit of U.S. Provisional Patent Application No. 61/222,923, filed on Jul. 2, 2009, which is hereby incorporated by reference as if fully set forth herein.

BACKGROUND OF THE INVENTION

1. Field of the Invention

The present invention relates to a dual mode terminal, and more particularly, to a dual mode terminal supporting location-based services and a control method for the same.

2. Discussion of the Related Art

Global Positioning System (GPS) technologies which use only satellites in order to obtain location information of a terminal have developed into an Assisted-GPS (A-GPS) technique along with development of wireless communication systems. As a technique for improving performance of a GPS satellite based location measurement system, the A-GPS technique processes and provides GPS information using data transmitted and received between a wireless device and a wireless communication network in order to increase accuracy of location information and increase the range of availability of location information.

The A-GPS technique is classified into a mobile-assisted A-GPS technique and a mobile-based A-GPS technique according to whether location information is calculated by a terminal or by a location information server. That is, in the mobile-assisted A-GPS technique, the terminal provides data to the location information server and the location information server generates and provides actual location information back to the terminal. On the other hand, in the mobile-based A-GPS technique, the location information server provides location information to the terminal and the terminal processes the location information using network information and calculates actual location information.

FIG. 1 is a conceptual diagram of a system that provides a conventional A-GPS technique.

As shown in FIG. 1, the terminal transmits and receives an application message to and from an application server through a CDMA network or through the Internet over the CDMA network. In addition, in order to receive location-based services, the terminal receives location information from GPS satellites and transmits and receives data to and from Position Determining Equipment (PDE), which is a location information server, through the CDMA network using an IS-801 communication protocol in order to support the A-GPS technique.

On the other hand, a dual mode mobile terminal, which supports two different wireless communication schemes, is generally used in a region where different communication networks coexist. A mobile terminal, which can use both Long Term Evolution (LTE) wireless communication and Code Division Multiple Access (CDMA) wireless communication, is attracting attention as a typical example of the dual mode mobile terminal.

SUMMARY OF THE INVENTION

Therefore, the present invention will suggest a structure of a dual mode terminal for supporting Location-Based Services (LBS). The present invention will also suggest a structure of a terminal, which supports location-based services in an LTE mobile communication network while minimally affecting an LBS system provided on a conventional CDMA mobile communication network, and a control method for the same.

An object of the present invention is to provide a dual mode terminal supporting location-based services and a control method for the same.

Objects of the present invention are not limited to the above object and other objects will be clearly understood by those skilled in the art from the following description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dual mode terminal for providing location-based services includes a first area including a first wireless communication unit for communication with a first communication network and a first processor for processing signals transmitted and received to and from the first communication network, and a second area including a second wireless communication unit for communication with a second communication network and a second processor for processing signals transmitted and received to and from the second communication network, wherein the first wireless communication unit includes a GPS receiver for receiving satellite GPS signals, the first processor includes a GPS engine for processing network location information received from the first communication network and the second communication network, and the second processor transfers network location information received from the second communication network to the first processor.

Preferably, the GPS engine may include a module for processing a network location information protocol of the first communication network, and the second processor may include a translator for converting a network location information protocol of the second communication network into the network location information protocol of the first communication network.

Alternatively, the GPS engine may include a module for processing a network location information protocol of the first communication network, and the second processor may include a module for processing a network location information protocol of the second communication network and a module for processing a Secure User Plane Location (SUPL) protocol. Here, the SUPL protocol may be set to ignore 1-bit information for a Closed Subscriber Group (CSG) among 29-bit cell ID information received from the second communication network.

Here, the network location information protocol of the first communication network may be a 3GPP2 IS-801 protocol. Further, the network location information protocol of the second communication network may be a Radio Resource Location services Protocol (RRLP) or a Radio Resource Control (RRC) protocol.

Ia//, the first communication network may be a Code Division Multiple Access (CDMA) communication network or a Wideband-CDMA (WCDMA) communication network, and the second communication network may be a Long Term Evolution (LTE) communication network.

More preferably, the dual mode terminal may be connected to an application area, and the first area may further include a module for determining whether data transmitted and received to and from the application area is data for communication with the first communication network or data for communication with the second communication network.

In addition, the dual mode terminal may further including a host interface for data transmission and reception between the first processor and the second processor.

In another aspect of the present invention, a method for measuring a location of a dual mode terminal including a CDMA area and an LTE area to allow the dual mode terminal to provide location-based services in a wireless communication system includes receiving a satellite GPS signal through a GPS receiver included in the CDMA area and transferring the satellite GPS signal to a GPS engine included in the CDMA area, receiving network location information from a location information server connected to the LTE network through a wireless communication unit included in the LTE area, converting the network location information into a CDMA location information protocol, transferring the converted network location information to the GPS engine, and measuring, by the GPS engine, a location of the dual mode terminal using the satellite GPS signal and the converted network location information.

The network location information may be received using a Radio Resource Location services Protocol (RRLP) or a Radio Resource Control (RRC) protocol and the CDMA location information protocol may be a 3GPP2 IS-801 protocol.

It is to be understood that both the foregoing general description and the following detailed description of the present invention are exemplary and explanatory and are intended to provide further explanation of the invention as claimed.

The present invention has a variety of advantages. For example, the dual mode terminal can effectively provide location-based services.

Advantages of the present invention are not limited to the above advantage and other advantages will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description will be given with reference to a 3GPP LTE system as a main mobile communication system, the following detailed description can also be applied to any other mobile communication system, except details specific to 3GPP LTE.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "terminal" is used to generally describe any mobile or stationary user device such as a User Equipment (UE) or a Mobile Station (MS). In addition, the term "base station" is used to generally describe any network node that communicates with the terminal such as a Node B or an eNode B.

Figure 1:
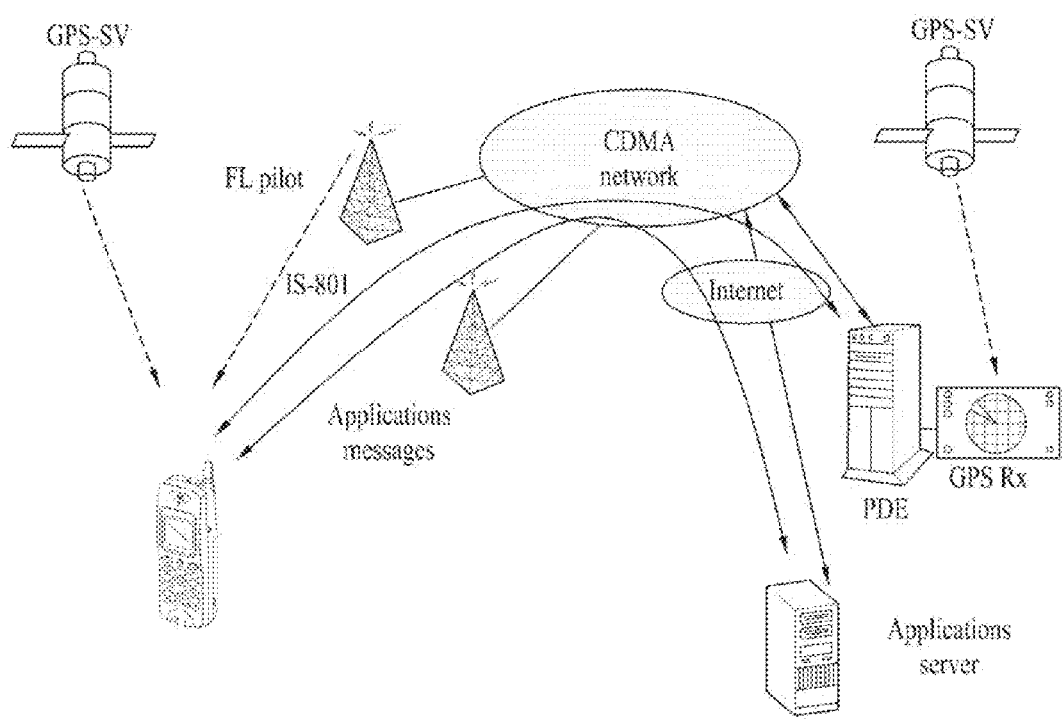
FIG. 1 is a conceptual diagram of a system that provides a conventional A-GPS technique.
Figure 2:
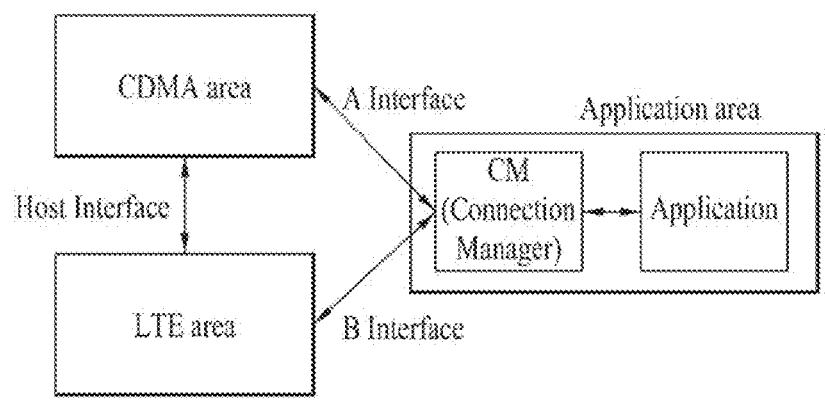
FIG. 2 is a conceptual diagram of a dual mode terminal that provides location-based services according to an embodiment of the present invention.

FIG. 2 is a conceptual diagram of a dual mode terminal that provides location-based services according to an embodiment of the present invention.

As shown in FIG. 2, a CDMA processor and an LTE processor are included in a CDMA area and an LTE area, respectively, and an RF part (or a wireless communication unit) for communicating with a CDMA network and an RF part for communicating with an LTE network are included in the CDMA area and the LTE area, respectively.

An application processor for executing applications is included in an application area. The application area may be constructed as a single hardware module or may be constructed as an independent entity, similar to a PC. A Connection Manager (CM), which manages CDMA or LTE connections or connection states depending on network environments, and an application, which uses GPS information, are executed in the application area.

The CM performs a switching function for data communication between the application and the GPS module and modem (LTE or CDMA modem) according to network connection states. That is, when the dual mode terminal is connected to the CDMA network, the CM transmits and receives application data through an "A" interface so that the CDMA area is connected to the application and, when the dual mode terminal is connected to the LTE network, the CM transmits and receives application data through a "B" interface so that the LTE area is connected to the application.

In addition, when the GPS module is provided in the CDMA area, GPS data is transmitted and received between the CDMA area and the application through the "A" interface. Here, when the dual mode terminal is connected to the LTE network, GPS data, which is transmitted and received to and from a GPS server (i.e., a location information server), can be transferred from the CDMA area to the LTE area using a host interface.

On the other hand, the dual mode terminal may include a GPS module that receives satellite GPS signals in order to receive location-based services. When the GPS module is embedded in the LTE area, GPS data is transmitted and received between the LTE area and the application through the "B" interface. Here, when the dual mode terminal is connected to the CDMA network, satellite GPS signals, which are transmitted and received to and from a GPS server, can be transferred from the LTE area to the CDMA area using a host interface.

The host interface, which is located between the CDMA area and the LTE area, can be used for transmission of control signals and data signals between the areas in order to provide location-based services.

Specific protocols, which can be included in the LTE area and the CDMA area, and a method for controlling the protocols are described below based on the above conceptual diagram of FIG. 2 for ease of explanation. However, the dual mode terminal may include only one of the "A" interface and the "B" interface depending on the structure of the dual mode terminal. For example, when the dual mode terminal includes only the "A" interface, communication between the LTE area and the CM of the application area may be implemented through the "A" interface and the host interface. Of course, when the dual mode terminal includes only the "B" interface, communication between the CDMA area and the CM of the application area may be implemented through the "B" interface and the host interface.

From the viewpoint of networks, it is an object of the dual mode terminal and the control method for the same disclosed in the present invention to provide location-based services on the LTE network while minimizing change in the configuration of the conventional location-based system supported by the CDMA network.

First Embodiment

Figure 3:
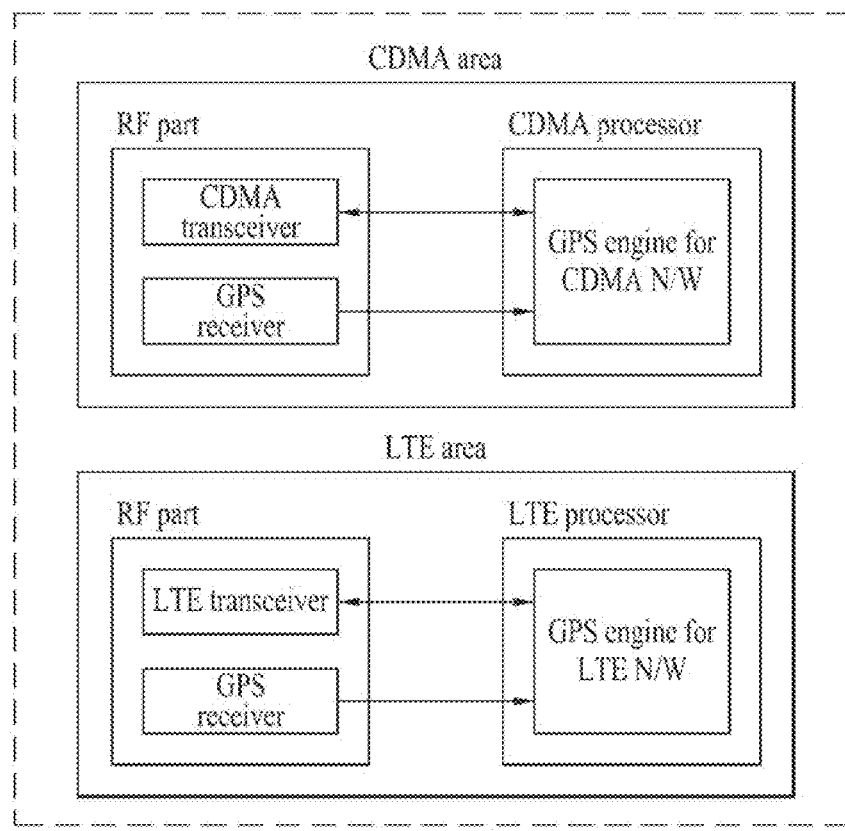
FIG. 3 is a block diagram illustrating a structure of a dual mode terminal according to a first embodiment of the present invention.

FIG. 3 is a block diagram illustrating a structure of a dual mode terminal according to a first embodiment of the present invention. Specifically, FIG. 3 illustrates a structure of a dual mode terminal in which an independent GPS receiver and an independent GPS engine are provided in each of the LTE area and the CDMA area to support location-based services on the LTE network and the CDMA network.

As shown in FIG. 3, an RF part (or a wireless communication unit) included in each of the LTE area and the CDMA area includes a transceiver and a GPS receiver. The RF part may be constructed as an independent hardware entity or a single hardware module. The transceiver includes a transmitter and a receiver. The transceiver may also be constructed as an independent hardware entity or a single hardware module.

A GPS engine included in each of the LTE processor of the LTE area and the CDMA processor of the CDMA area provides a plurality of functions such as network access and location calculation for location-based services for a network of a corresponding protocol. That is, the GPS engine may determine the current position of the terminal using satellite GPS signals alone in a standalone GPS mode and may determine the current position using both satellite GPS information and location information of a corresponding protocol (for example, Secure User Plane Location (SUPL), 3GPP Radio Resource Location services Protocol (RRLP), Radio Resource Control (RRC), or 3GPP2 IS-801) in an MS-based/MS-assisted mode.

Figure 4:
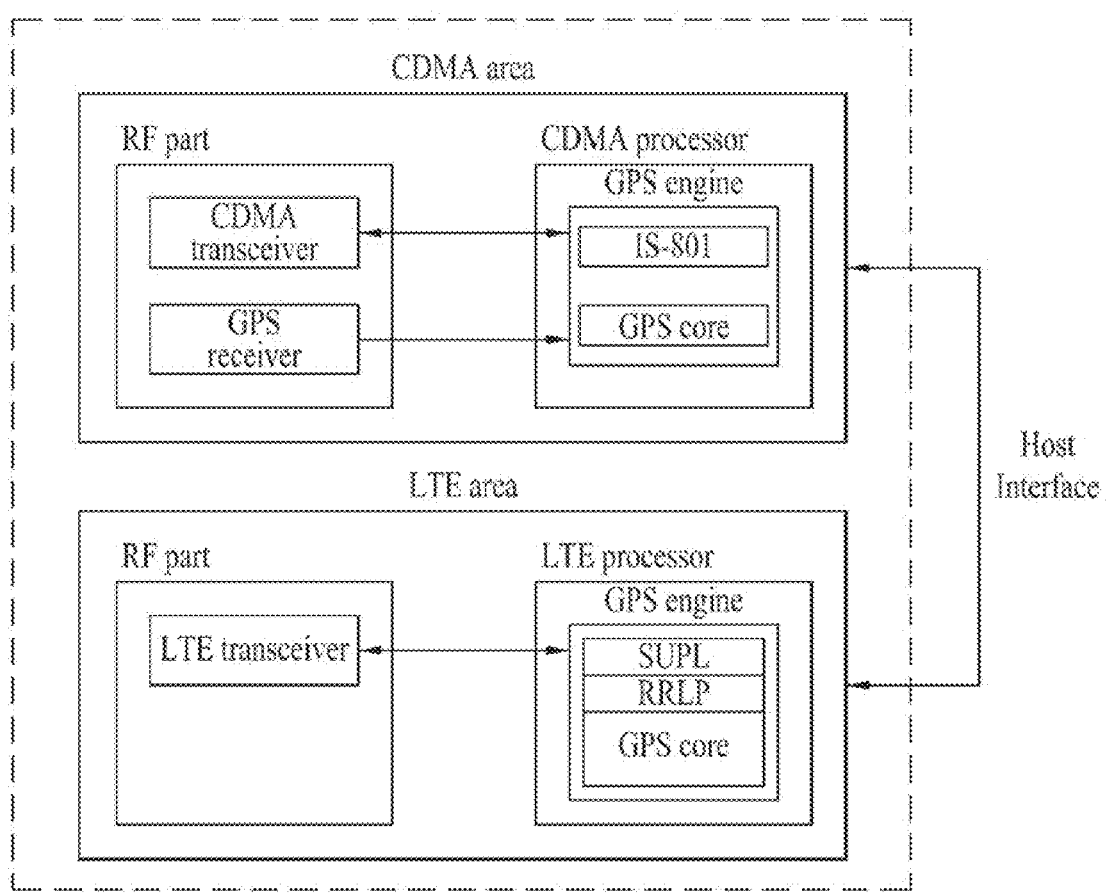
FIG. 4 is a block diagram illustrating another structure of a dual mode terminal according to the first embodiment of the present invention.

FIG. 4 is a block diagram illustrating another structure of a dual mode terminal according to the first embodiment of the present invention. The biggest difference from the structure of FIG. 3 is that no GPS receiver is included in the RF part of the LTE area. In addition, the host interface is located between the CDMA area and the LTE area and can be used for control and data signal transmission between the areas.

As shown in FIG. 4, an RF part included in the CDMA area includes a transceiver and a GPS receiver. The RF part may be constructed as an independent hardware entity or a single hardware module. A GPS engine included in a CDMA processor of the CDMA area includes an IS-801 protocol that is responsible for communication with the CDMA network and a GPS core for GPS signal processing. When the dual mode terminal is connected to the LTE network, the GPS core included in the CDMA processor of the CDMA area receives satellite GPS signals from the GPS receiver and provides the received satellite GPS signals to a GPS engine included in an LTE processor of the LTE area using the host interface.

An RF part included in the LTE area includes a transceiver. A GPS engine included in the LTE processor of the LTE area provides a function for communication with the location information server using RRLP and a Secure User Plane Location (SUPL) protocol responsible for communication with the LTE network. A GPS core included in the GPS engine provides a plurality of functions such as location calculation using satellite GPS information received from the CDMA area and network location information received through the LTE network.

Here, SUPL is a protocol for providing location-based services, defined by Open Mobile Alliance (OMA). When providing location-based services, the SUPL protocol allows an information server and a terminal to directly exchange data associated with location information, avoiding communication between network nodes which is required to perform a conventional positioning procedure. Thus, the SUPL protocol reduces costs for implementing nodes required for positioning and provides more accurate positioning services.

More specifically, since the conventional protocol for location-based services focuses mainly on a procedure for signaling in a control plane of each network, to reflect a new positioning method in a positioning system of each network each time the new positioning method is introduced, it is necessary to correct control plane signaling and protocols and also to update all elements, which have changed in the control plane, among all network elements or to introduce new elements for such changed elements. Here, the term "control plane" refers to an area responsible for user data management, for example, controlling user data and establishing a channel for data transmission, unlike a user plane in which data actually used by users is transmitted. On the other hand, the SUPL protocol is defined between the location information server and the terminal so that positioning procedure and corresponding protocol information are transmitted through the user plane rather than the control plane.

Different versions of SUPL support different networks. Specifically, SUPL 1.0 supports CDMA, WCDMA, and GSM and SUPL 2.0 supports WLAN, WiMAX, UMB, and LTE (Release 8). In addition, SUPL 3.0 supports LTE (Release 9).

SUPL versions used in the embodiments of the present invention include version 2.0 or higher and modified version 1.0 which includes a function to access the LTE network in addition to the functions of version 1.0.

Second Embodiment

A second embodiment of the present invention relates to the case where a dual mode terminal uses a 3GPP2 IS-801 protocol to provide location-based services when the dual mode terminal is connected to an LTE network. Allowing both the network and the terminal to support SUPL may be somewhat of burden upon the current system for providing location-based services. Thus, if the IS-801 protocol, which is a conventional protocol for location-based services, is used, it is possible to provide location-based services on the LTE network by minimally adding and modifying software modules in the CDMA area without system change.

Figure 5:
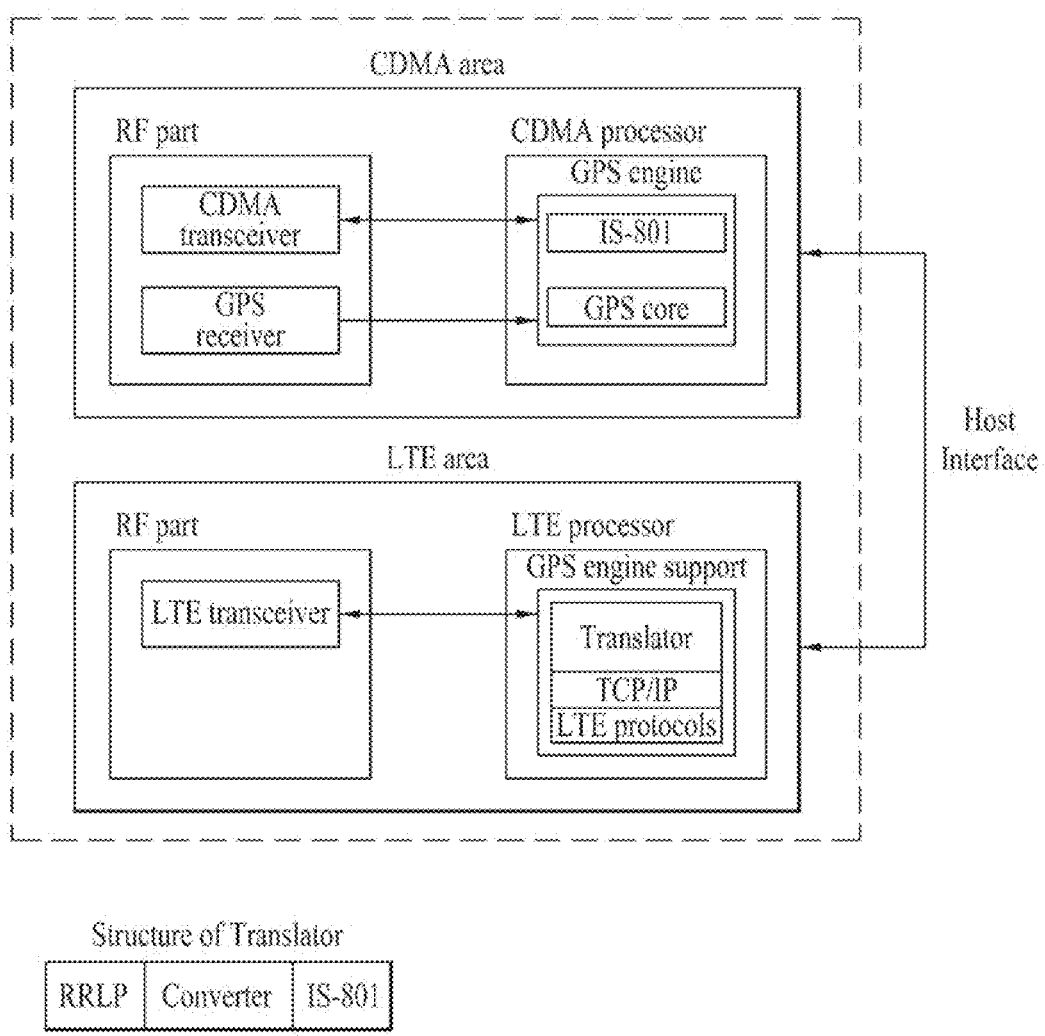
FIG. 5 is a block diagram illustrating a dual mode terminal according to a second embodiment of the present invention.

FIG. 5 is a block diagram illustrating a dual mode terminal according to a second embodiment of the present invention. Specifically, FIG. 5 illustrates a structure of a dual mode terminal which can support location-based services on both the LTE network and the CDMA network by providing a GPS receiver and a GPS core, which can be shared with an LTE area, in a CDMA area to reduce hardware complexity. The configuration of the CDMA area and the configuration of the LTE area may be swapped. That is, the GPS receiver and the GPS core, which have main functions to provide location-based services, may be included in the LTE area, instead of in the CDMA area, to support location-based services.

As shown in FIG. 5, an RF part included in the CDMA area includes a transceiver and a GPS receiver. The RF part may be constructed as an independent hardware entity or a single hardware module. The transceiver includes a transmitter and a receiver. The GPS receiver included in the CDMA area is used to receive GPS signals both when the dual mode terminal is connected to the CDMA network and when the dual mode terminal is connected to the LTE network. A host interface is provided between the CDMA area and the LTE area and can be used for transmission of control signals and data signals between the areas in order to provide location-based services.

A GPS engine included in the CDMA processor of the CDMA area includes an IS-801 module that processes a protocol responsible for communication with the CDMA network and a GPS core for GPS signal processing. The GPS engine may control the operation of the terminal both when the terminal is connected to the CDMA network and when the terminal is connected to the LTE network.

When the dual mode terminal is connected to the CDMA network, the IS-801 module provides a function for communication with the location information server through the CDMA network and the GPS core provides a plurality of functions such as location calculation for location-based services using satellite GPS signals received from the GPS receiver and network location information received from the location information server. That is, the GPS engine may determine the current position of the terminal using satellite GPS signals alone in a standalone GPS mode and may determine the current position using a combination of satellite GPS information and network location information that is received from the location information server through the CDMA network in an MS-based/MS-assisted mode.

When the dual mode terminal is connected to the LTE network, network location information received from the location information server through the LTE network using RRLP and SUPL is provided to the GPS engine included in the CDMA processor of the CDMA area through the host interface and the GPS engine provides a plurality of functions such as location calculation using satellite GPS signals and location information received from the LTE network. That is, the GPS engine may determine the current position of the terminal using satellite GPS signals alone in a standalone GPS mode and may determine the current position using a combination of satellite GPS information and network location information that is received from the location information server through the LTE network in an MS-based/MS-assisted mode.

A GPS engine support (or GPS engine assistance unit) included in the LTE processor of the LTE area includes a translator for supporting location-based services. The translator functions to convert the 3GPP RRLP or RRC protocol of network location information received from the LTE network into IS-801 in order to allow the GPS core included in the CDMA processor of the CDMA area to perform location calculation.

Figure 6:
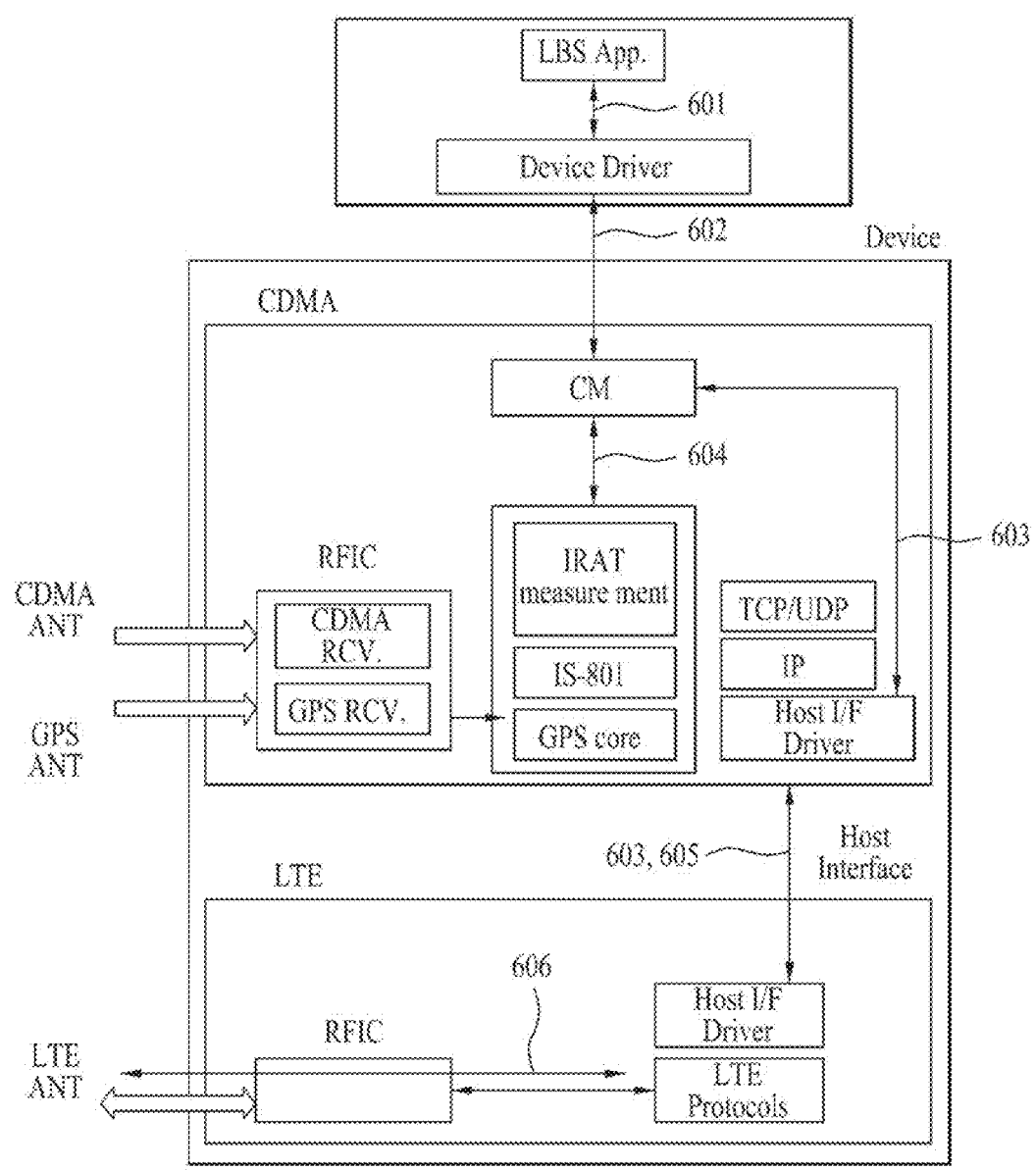
FIG. 6 illustrates an operation method of a dual mode terminal according to the second embodiment of the present invention.

FIG. 6 illustrates an operation method of a dual mode terminal according to the second embodiment of the present invention. In the method of FIG. 6, it is assumed that the terminal is connected to the LTE network and a GPS receiver is included only in the CDMA area as in FIG. 5. Especially, it is assumed that the CDMA processor is a host processor connected to an application area.

In FIG. 6, an inter-RAT (IRAT) measurement module which may be included in the CDMA area is a module for providing CDMA wireless signal measurement information to an LTE processor and an IS-801 module is a module for generating an IS-801 message using satellite GPS information measured through a GPS core and network location information obtained through CDMA wireless signal measurement.

As shown in FIG. 6, when a location-based service application is executed in the application area at step 601, a device deriver notifies a CM included in the CDMA area of the terminal of the location-based service application at S602.

When the LTE processor is in an activated state, the CM issues an instruction to initialize a protocol for providing location-based services of the LTE processor through the host interface and relevant software modules at step 603. Simultaneously or sequentially, the CM calls an IS-801 protocol included in the GPS engine of the CDMA area at step 604. More specifically, the IS-801 module may generate IS-801 data using CDMA wireless signal measurement information received from the IRAT measurement module and satellite GPS information provided by the GPS core.

The IS-801 data may be transmitted and received to and from the LTE processor using the host interface and an IP/TCP or UDP protocol at step 605 and may be processed into user data in the LTE processor at step 606.

Figure 7:
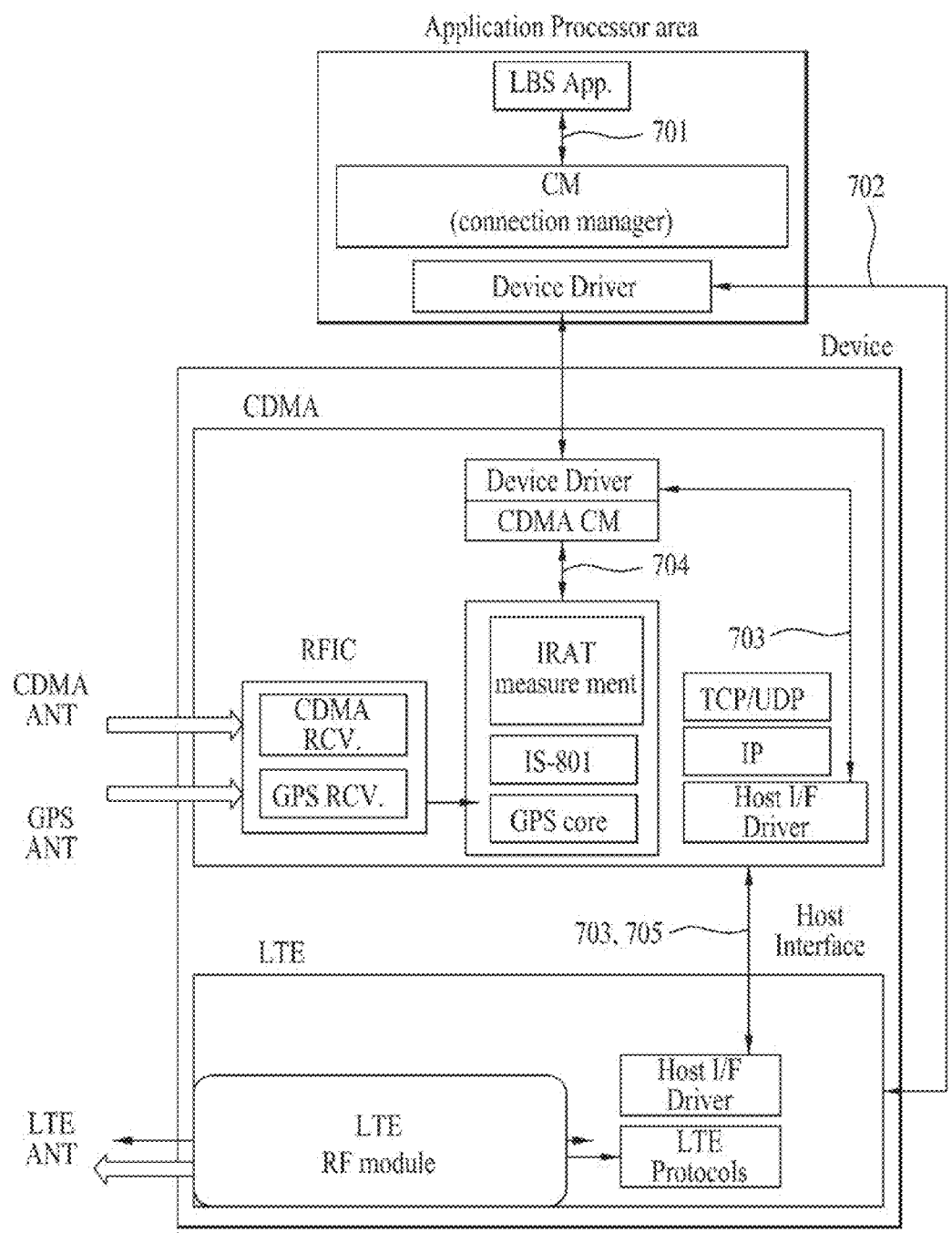
FIG. 7 illustrates an operation method of a dual mode terminal according to the second embodiment of the present invention.

FIG. 7 illustrates an operation method of a dual mode terminal according to the second embodiment of the present invention.

The method of FIG. 7 differs from that of FIG. 6 in that the CM in the application area transfers data to an activated processor among the LTE processor and the CDMA processor. That is, while the LTE area performs transmission and reception to and from the application area through the CDMA area in FIG. 6, the LTE area and the CDMA area can individually perform transmission and reception to and from the application area in FIG. 7. A detailed description of the other processes is omitted herein since the other processes are similar to those of FIG. 6.

Figure 8:
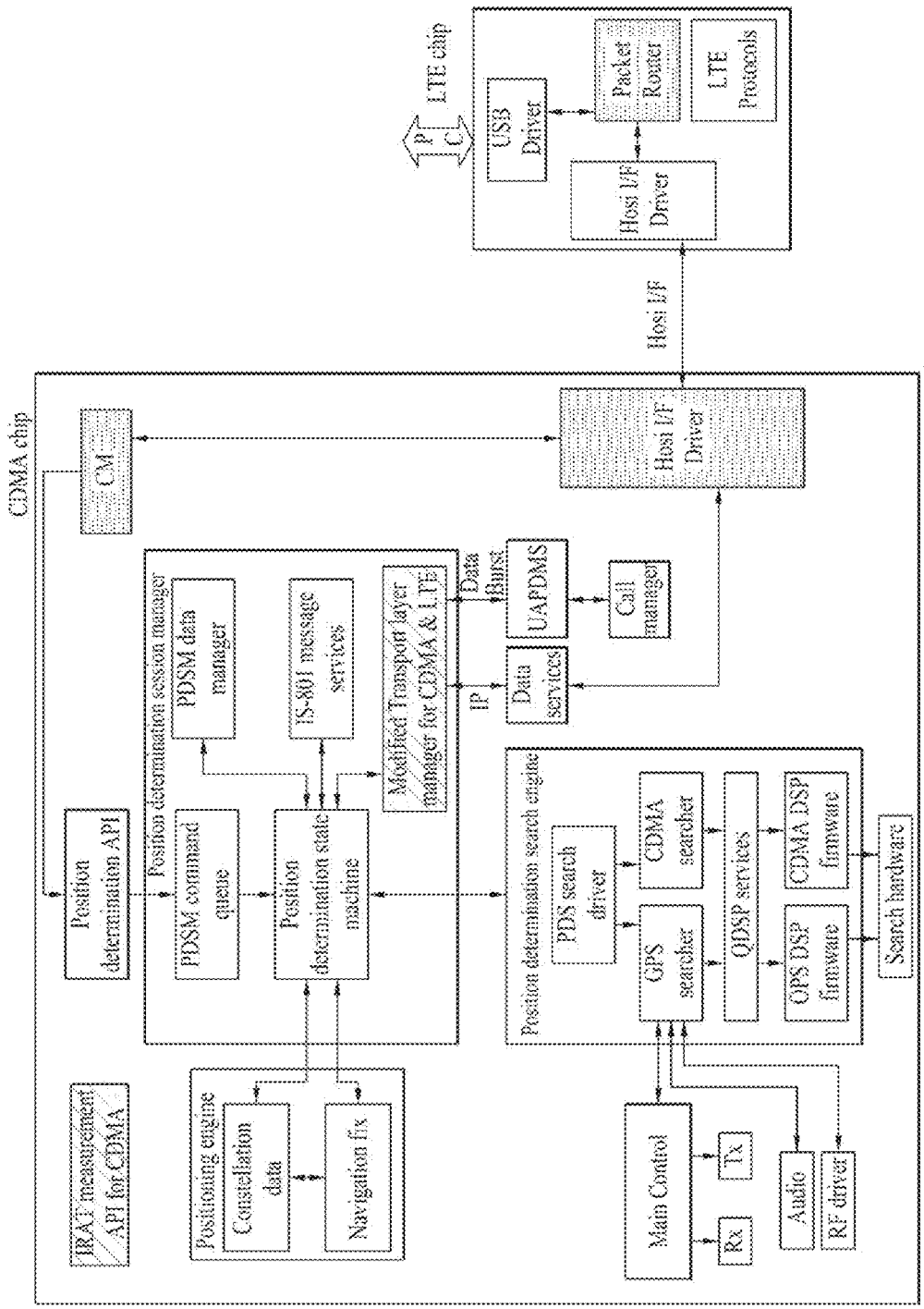
FIG. 8 is a block diagram illustrating the configuration of software modules that may be included in a dual mode terminal according to the second embodiment of the present invention.

FIG. 8 is a block diagram illustrating the configuration of software modules that may be included in a dual mode terminal according to the second embodiment of the present invention.

As can be seen from FIG. 8, not only software modules included in a conventional CDMA chip that has been commercialized but also both an IRAT measurement API for CDMA and a modified transport layer manager for CDMA & LTE are added to a CDMA chip of FIG. 8. Here, the IRAT measurement API for CDMA is a software module for allowing measurement information of the CDMA network to be obtained at the LTE chip, and the modified transport layer manager for CDMA & LTE performs a function to determine whether a packet received from a data service module is to be processed at the LTE chip or at the CDMA chip.

Figure 9:
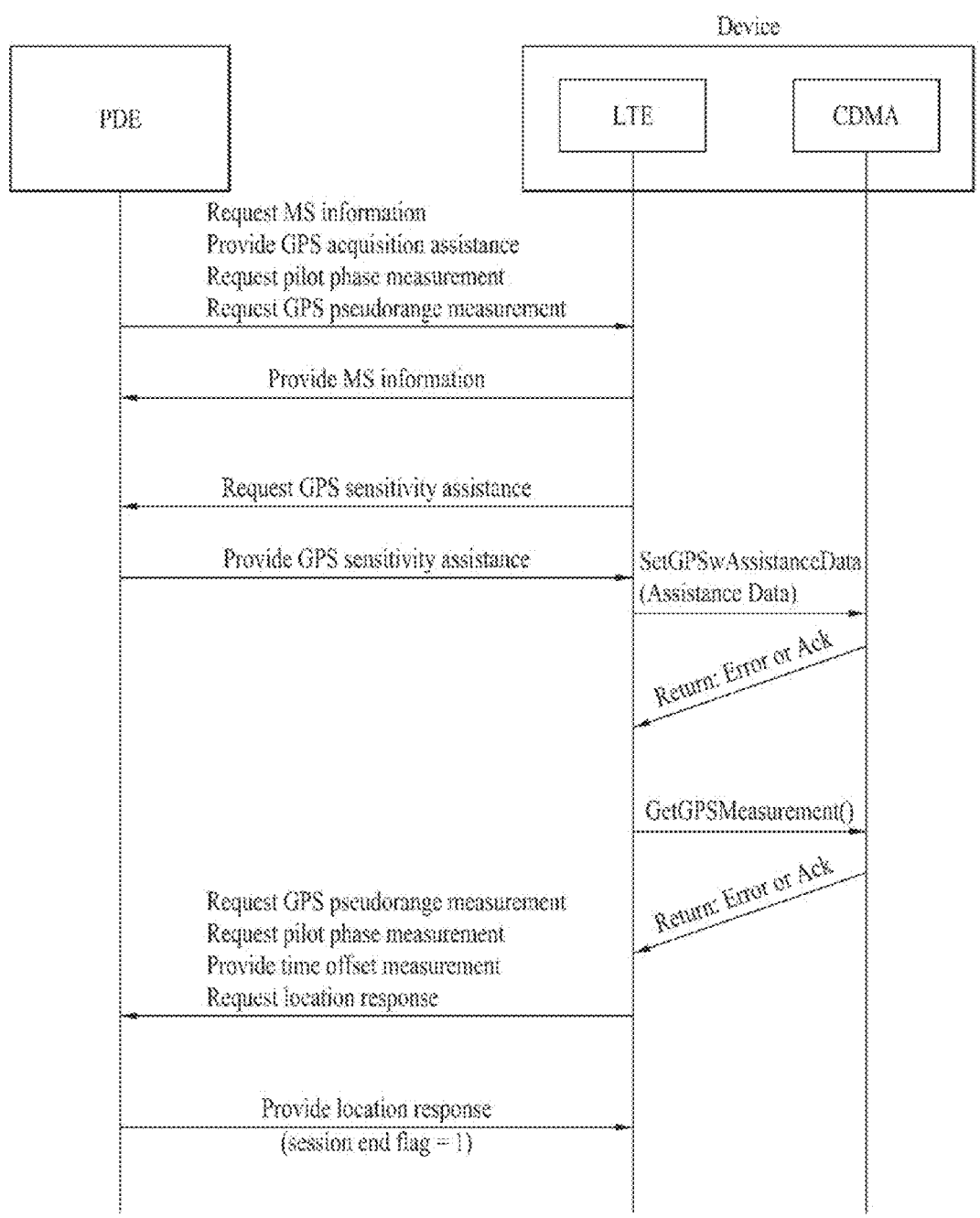
FIG. 9 is a signal flow diagram illustrating an example of a method for obtaining location information of a dual mode terminal according to the second embodiment of the present invention.

FIG. 9 is a signal flow diagram illustrating an example of a method for obtaining location information of a dual mode terminal according to the second embodiment of the present invention. In the example of FIG. 9, it is assumed that the dual mode terminal is connected to the LTE network and operates in an MS-assisted mode.

As shown in FIG. 9, a Position Determination Entity (PDE), i.e., a location information server, sends a request-MS-information message, a provide-GPS-acquisition-assistance message, a request-pilot-phase-measurement message, and a request-GPS-pseudorange-measurement message to an LTE area of the dual mode terminal. In this case, the LTE area of the dual mode terminal sends corresponding messages to the PDE in response to the messages received from the PDE, thereby initializing a position measurement preparation procedure. The LTE area of the dual mode terminal also transfers a 'SetGPSAssistanceData' message to the CDMA area of the dual mode terminal. Here, the 'SetGPSAssistanceData' message is a message for issuing an instruction to set the GPS assistance data received from the PDE as assistance data of a GPS module included in the CDMA area.

The CDMA area then transfers an error message or an ACK message to the LTE area to indicate whether or not position measurement has been completed. In this case, the LTE area transfers a 'GetGPSMeasurement' message to the CDMA area. Here, the 'GetGPSMeasurement' message is a message for obtaining current location information from the GPS module included in the CDMA area. The CDMA area sends location information to the LTE area in response to the 'GetGPSMeasurement' message received from the LTE area.

Then, the LTE area transfers a GPS pseudorange measurement result based on the current location information, together with pilot phase measurement and time offset measurement results, to the PDE and requests location information of the terminal calculated by the PDE. Finally, the PDE provides location information for location-based services to the terminal.

Third Embodiment

A third embodiment of the present invention relates to the case where a dual mode terminal uses SUPL and IS-801 protocols to provide location-based services when the dual mode terminal is connected to the LTE network. However, there is a need to modify SUPL 1.0 since it does not support the LTE network. Specifically, network information required by SUPL is a cell ID and a cell ID of WCDMA supported by SUPL 1.0 is 28 bits. On the other hand, an ID of an LTE cell in SUPL 2.0 is 29 bits and additionally includes 1-bit information for supporting a Closed Subscriber Group (CSG) femtocell, compared to the 28-bit WCDMA cell ID. Accordingly, the modified SUPL 1.0 suggested in the present invention may be set to ignore the 1-bit information for supporting the CSG femtocell included in the ID of the LTE cell, thereby allowing the LTE network to be supported in SUPL 1.0.

In addition, in the third embodiment of the present invention, the CDMA area (CDMA chip) needs to support a SUPL protocol and to include an interface between the SUPL protocol and the GPS module. That is, the CDMA area (CDMA chip) may include a 'positioning determination state machine' module for supporting the IS-801 protocol and may include a TCP/IP protocol stack. Further, the CDMA area needs to include an interface between the SUPL protocol and the CM in order to obtain LTE cell information.

On the other hand, the LTE area (LTE chip) should include a module that performs a router function that can distinguish between SUPL data and other user data based on a server IP address and a port number.

Further, a SUPL Location Platform (SLP), i.e., the location information server, supports IS-801 as a protocol for satellite GPS information and LTE network location information may be provided through SUPL data rather than through IS-801 data to the location information server.

Figure 10:
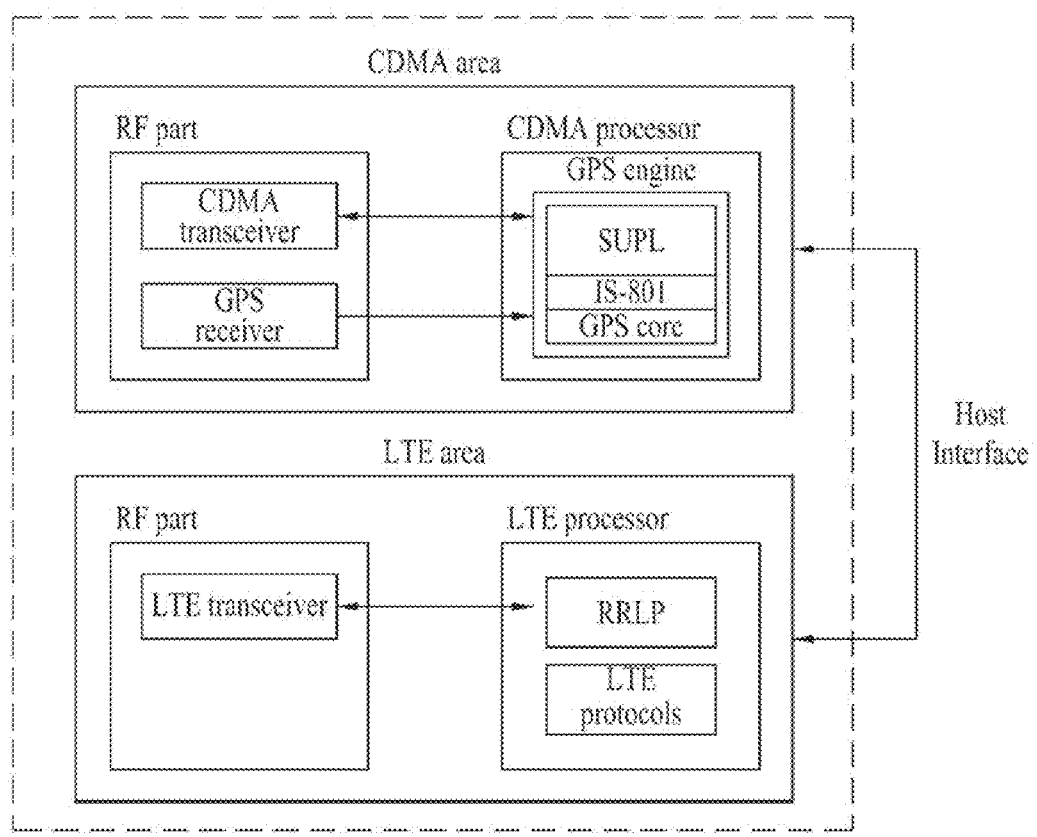
FIG. 10 is a block diagram illustrating a structure of a dual mode terminal according to a third embodiment of the present invention.

FIG. 10 is a block diagram illustrating a structure of a dual mode terminal according to the third embodiment of the present invention. Specifically, FIG. 10 illustrates a structure of a dual mode terminal which can support location-based services on both the LTE network and the CDMA network by providing a GPS receiver and a GPS core, which can be shared with an LTE area, in a CDMA area to reduce hardware complexity. The configuration of the CDMA area and the configuration of the LTE area may be swapped. That is, the GPS receiver and the GPS core, which have main functions to provide location-based services, may be included in the LTE area, instead of in the CDMA area, to support location-based services.

As shown in FIG. 10, an RF part included in the CDMA area includes a transceiver and a GPS receiver. The RF part may be constructed as an independent hardware entity or a single hardware module. The transceiver includes a transmitter and a receiver. The GPS receiver included in the CDMA area is used to receive GPS signals both when the dual mode terminal is connected to the CDMA network and when the dual mode terminal is connected to the LTE network. A host interface is provided between the CDMA area and the LTE area and can be used for transmission of control signals and data signals between the areas in order to provide location-based services.

Specifically, when the dual mode terminal is connected to the CDMA network, a GPS engine included in the CDMA processor of the CDMA area may include a SUPL module and an IS-801 module for processing a protocol responsible for communication with the CDMA network and a GPS core for GPS signal processing. The GPS core included in the CDMA processor provides a plurality of functions such as location calculation using satellite GPS signals acquired from the GPS receiver and network location information acquired from the location information server through SUPL and IS-801. That is, the GPS engine may determine the current position of the terminal using satellite GPS signals alone in a standalone GPS mode and may determine the current position using a combination of satellite GPS information and network location information that is received from the location information server through the CDMA network in an MS-based/MS-assisted mode.

When the dual mode terminal is connected to the LTE network, an RRLP module included in the LTE processor of the LTE area receives network location information from the location information server of the LTE network and transfers the received network location information to the GPS core included in the CDMA processor of the CDMA area through the host interface. The GPS core included in the CDMA processor of the CDMA area provides a function to determine the location of the terminal using satellite GPS signals received from the GPS receiver of the CDMA area and network location information received from the LTE area.

Further, in this embodiment, the LTE processor of the LTE area does not require a separate GPS engine and functions to receive a SUPL packet generated from the GPS engine of the CDMA area and to communicate with a location information server connected to the LTE network using RRLP. Accordingly, in the case where the dual mode terminal is connected to the LTE network, location calculation for providing location-based services is performed by the GPS engine of the CDMA area. That is, the GPS engine may determine the current position of the terminal using satellite GPS signals alone in a standalone GPS mode and may determine the current position using a combination of satellite GPS information and network location information that is received from the location information server through the LTE network in an MS-based/MS-assisted mode. SUPL versions that may be used in this case include version 2.0 or higher and modified version 1.0 which includes a function to access the LTE network in addition to the functions of version 1.0.

Figure 11:
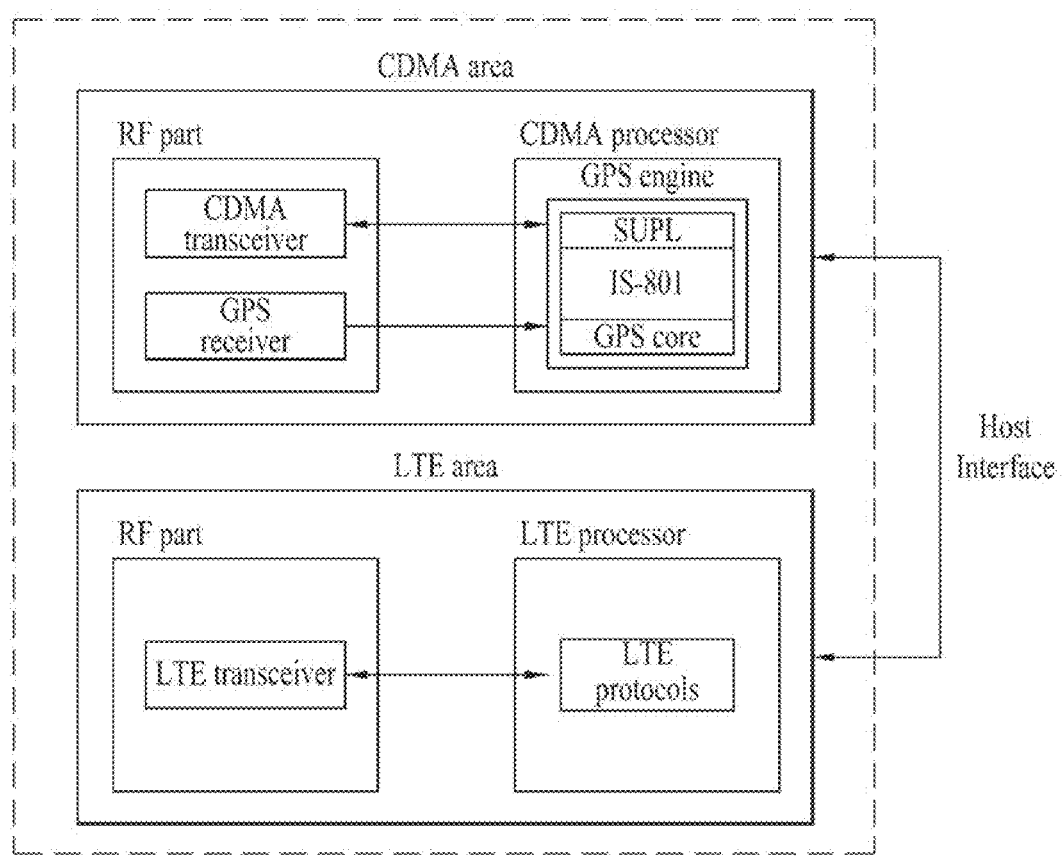
FIG. 11 is a block diagram illustrating another structure of a dual mode terminal according to the third embodiment of the present invention.

FIG. 11 is a block diagram illustrating another structure of a dual mode terminal according to the third embodiment of the present invention. The difference of the structure of FIG. 11 from that of FIG. 10 is that an LTE protocol module different from an RRLP module, which is also an LTE protocol module, may be provided in the LTE area.

When the dual mode terminal is connected to the LTE network, an LTE protocol module for providing location-based services, which is included in the LTE processor of the LTE area, receives network location information from a location information server on the LTE network and transfers the received network location information to a GPS core included in a CDMA processor of the CDMA area through the host interface. A GPS core included in the CDMA processor of the CDMA area provides a function to determine the location of the terminal using the network location information and satellite GPS signals received from the GPS receiver.

Figure 12:
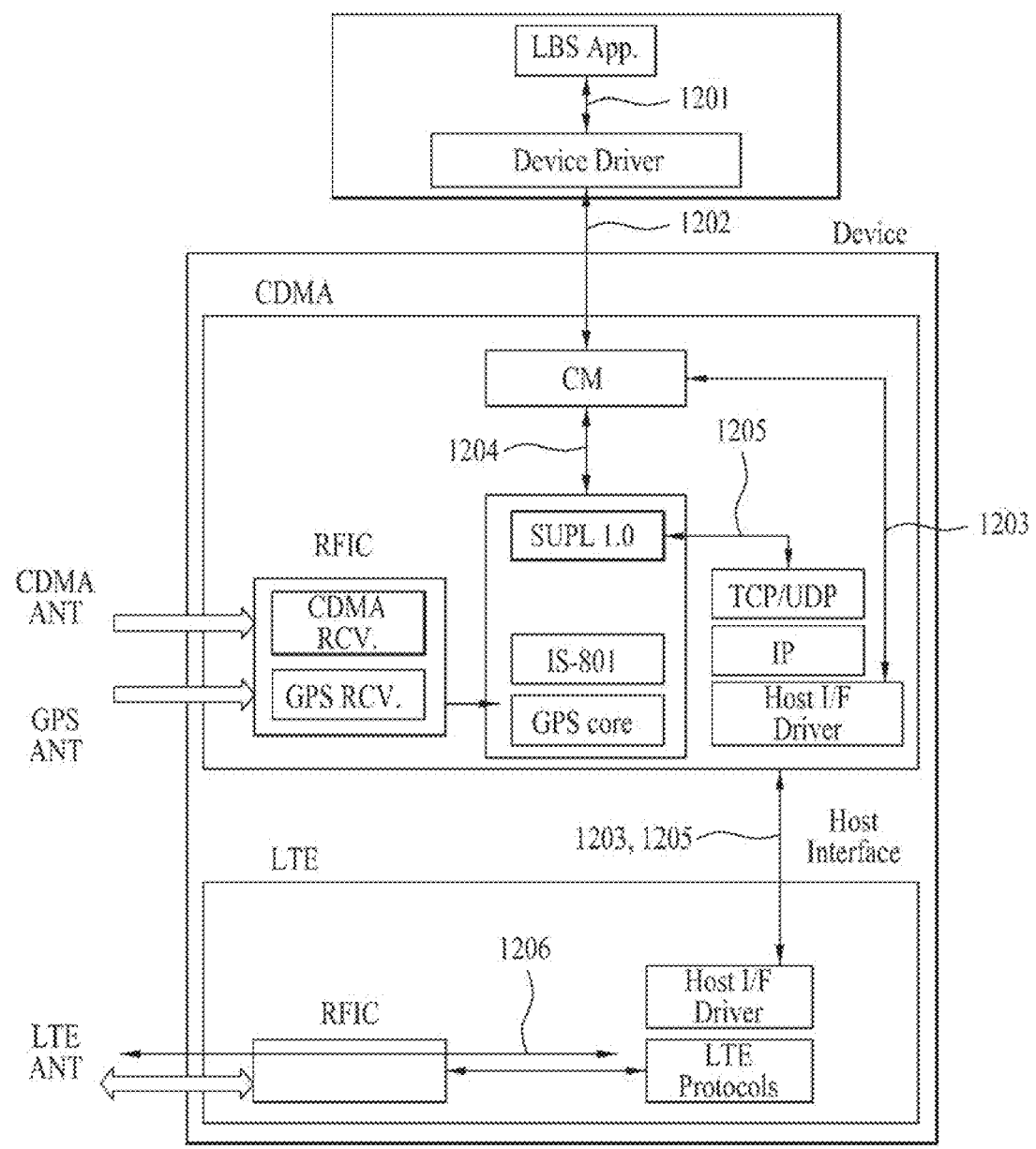
FIG. 12 illustrates an operation method of a dual mode terminal according to the third embodiment of the present invention.

FIG. 12 illustrates an operation method of a dual mode terminal according to the third embodiment of the present invention. In the method of FIG. 12, it is assumed that the terminal is connected to the LTE network and a GPS receiver is included only in the CDMA area as in FIGS. 10 and 11. Especially, it is assumed that the CDMA processor is a host processor.

In FIG. 12, an IS-801 module generates an IS-801 message using satellite GPS information measured through a GPS core and network location information obtained through CDMA wireless signal measurement. In the MS-based mode, the GPS core provides a plurality of functions such as location calculation using the satellite GPS information and the location information.

As shown in FIG. 12, when a location-based service application is executed in the application area at step 1201, a device deriver notifies a CM included in the CDMA area of the terminal of the location-based service application at step 1202.

When the LTE processor is in an activated state, the CM receives cell information of LTE from the LTE area through a host interface at step 1203. Simultaneously or sequentially, the CM calls a SUPL start function using the LTE cell information as an argument at step 1204. More specifically, the SUPL start function initializes GPS modules (SUPL and IS-801 modules). The SUPL module generates SUPL data using LTE network information.

The SUPL data may be transmitted and received to and from the LTE processor using the host interface and a data protocol stack such as an IP/TCP or UDP protocol at step 1205 and may be processed into user data in the LTE processor at step 1206.

Figure 13:
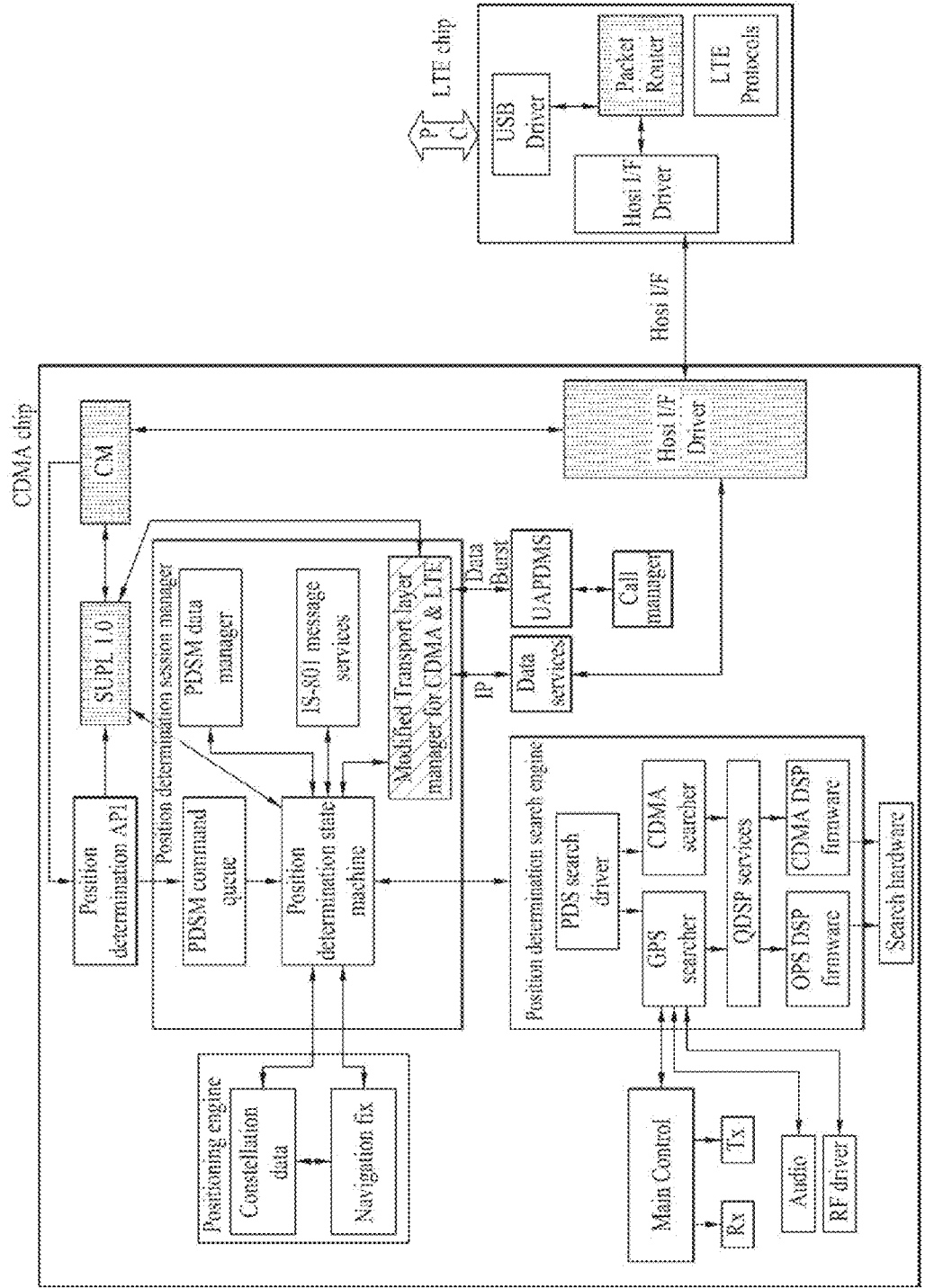
FIG. 13 is a block diagram illustrating the configuration of software modules that may be included in a dual mode terminal according to the third embodiment of the present invention.

FIG. 13 is a block diagram illustrating the configuration of software modules that may be included in a dual mode terminal according to the third embodiment of the present invention.

As can be seen from FIG. 13, not only software modules included in a conventional CDMA chip that has been commercialized but also both a Secure User Plane Location (SUPL) 1.0 module and a modified transport layer manager for CDMA & LTE are added to a CDMA chip of FIG. 13. When the LTE area has been activated, the SUPL 1.0 module performs functions to generate SUPL data including an IS-801 message using a 'position determination state machine' module and to transfer the SUPL data to the LTE area in order to transmit the SUPL data to the LTE network.

In addition, the 'modified transport layer manager for CDMA & LTE' module performs a function to route a SUPL-related packet among packets received from the LTE network to the SUPL 1.0 module and performs a function to route an IS-801-related packet among packets received from the CDMA network to the 'position determination state machine' module.

Figure 14:
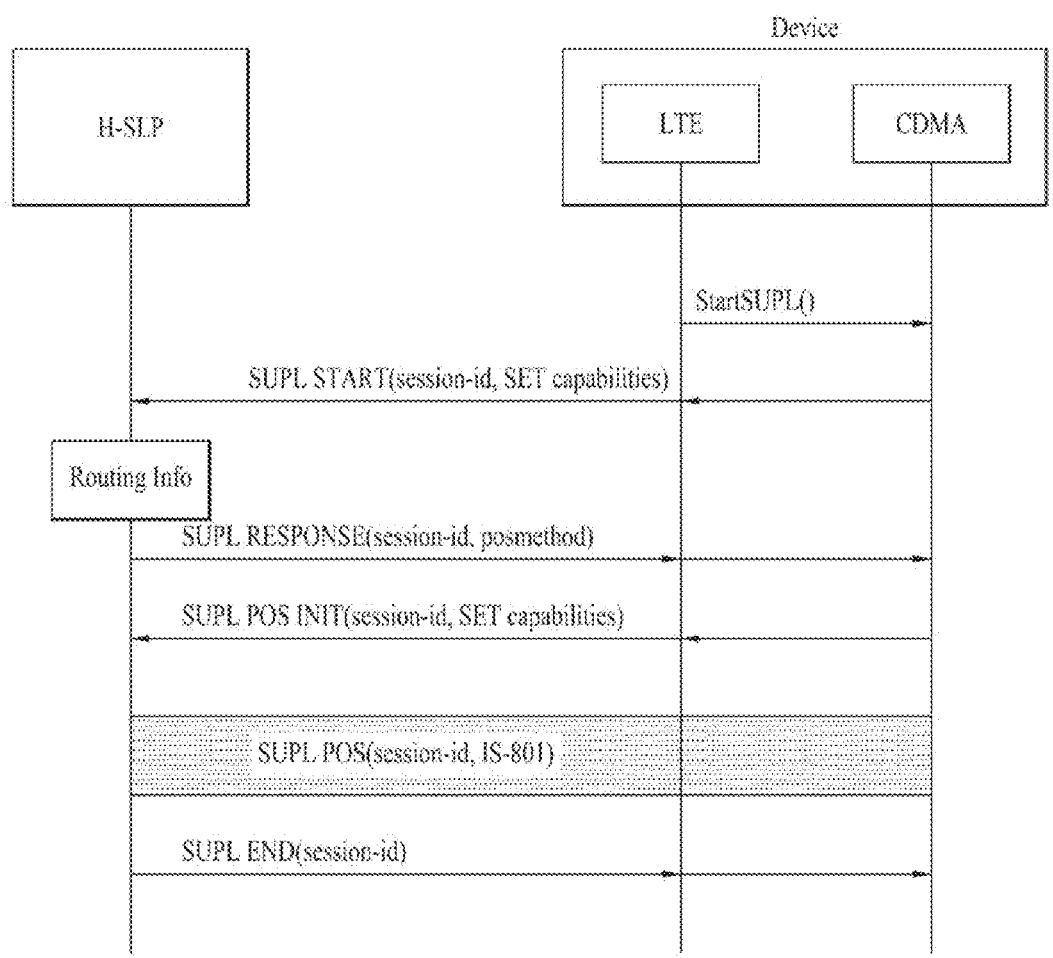
FIG. 14 is a signal flow diagram illustrating an example of a method for obtaining location information of a dual mode terminal according to the third embodiment of the present invention.

FIG. 14 is a signal flow diagram illustrating an example of a method for obtaining location information of a dual mode terminal according to the third embodiment of the present invention. In the example of FIG. 14, it is assumed that the dual mode terminal is connected to the LTE network and operates in an MS-assisted mode.

As shown in FIG. 14, the LTE area of the dual mode terminal transfers a StartSUPL message, which instructs initialization of the SUPL module of CDMA, to the CDMA area. Upon receiving the StartSUPL message, the dual mode terminal performs a procedure for initializing a SUPL protocol between a Home SUPL Location Platform (H-SLP) (i.e., the location information server) and a SUPL Enabled Terminal (SET) (i.e., the dual mode terminal), for example, a procedure for transmitting a SUPL_START message, receiving a SUPL_RESPONSE message, and receiving a SUPL_POS INT message.

After performing the initialization procedure, the dual mode terminal and the location information server perform a SUPL POS procedure which obtains the current position of the terminal using SUPL. This embodiment is characterized in that IS-801 is used as a protocol for determining the position of the terminal. After position determination (position search) is completed, the location information server transfers a SUPL_END message to the dual mode terminal, thereby terminating the SUPL_POS procedure.

Fourth Embodiment

A fourth embodiment of the present invention relates to the case where a dual mode terminal uses SUPL and RRLP protocols to provide location-based services when the dual mode terminal is connected to the LTE network.

In addition, in the third embodiment of the present invention, the CDMA area (CDMA chip) needs to support a SUPL 1.0 protocol and to include an interface between the SUPL protocol and the GPS module. That is, the CDMA area (CDMA chip) may include a 'positioning determination state machine' module for supporting the RRLP protocol and may include a TCP/IP protocol stack. Further, the CDMA area needs to include an interface between the SUPL protocol and the CM in order to obtain LTE cell information.

On the other hand, the LTE area (LTE chip) should include a module that performs a packet router function that can distinguish between SUPL packets and other user packets based on a server IP address and a port number.

Further, the location information server supports RRLP as a protocol for satellite GPS information and LTE network location information may be provided to or from the location information server through SUPL packets rather than through RRLP packets.

Figure 15:
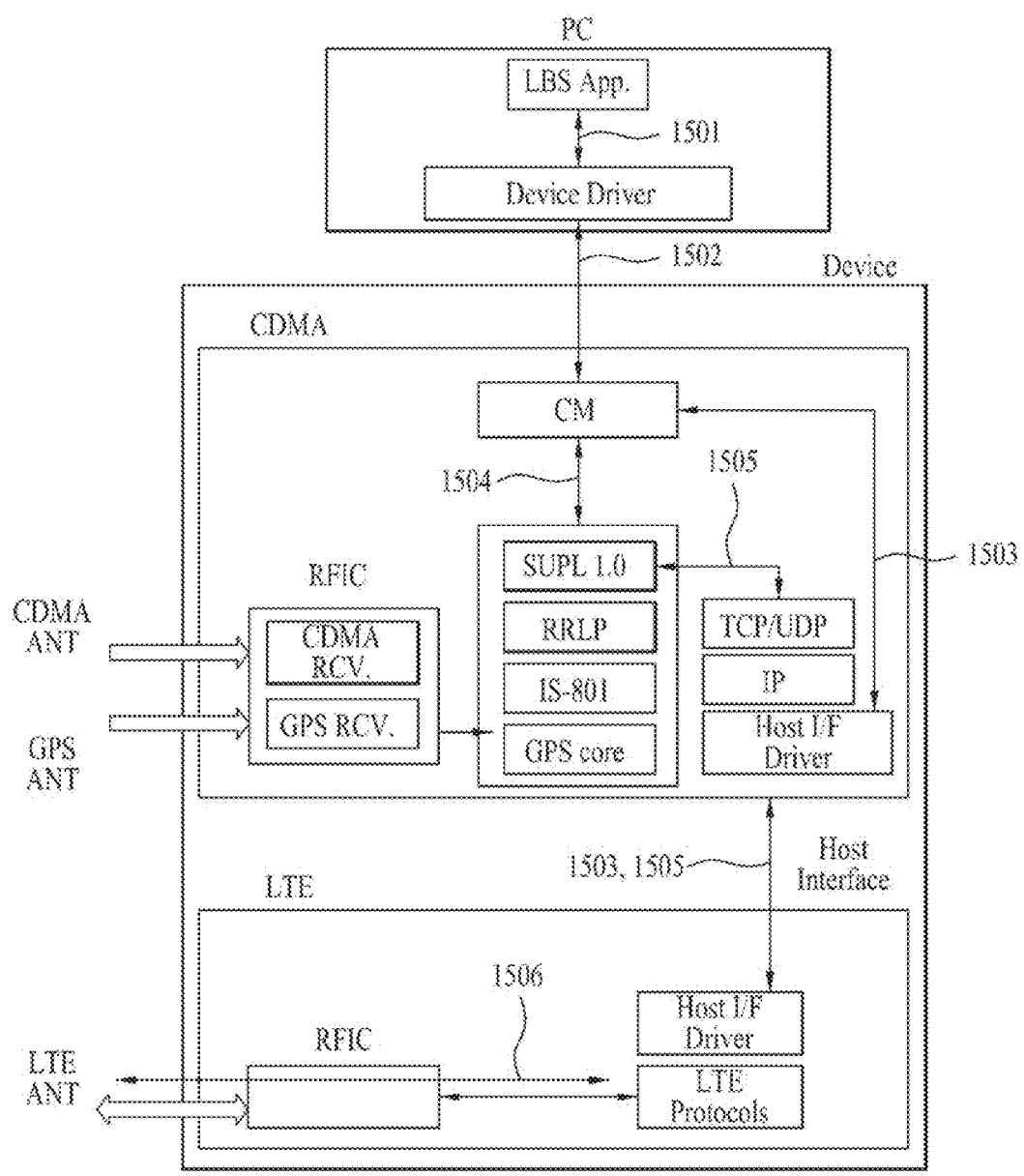
FIG. 15 illustrates an operation method of a dual mode terminal according to a fourth embodiment of the present invention.

FIG. 15 illustrates an operation method of a dual mode terminal according to the fourth embodiment of the present invention. In the method of FIG. 15, it is assumed that a GPS receiver is included only in the CDMA area when the terminal is connected to the LTE network. Especially, it is assumed that the CDMA processor is a host processor.

In FIG. 15, an IS-801 module generates an IS-801 message using satellite GPS information measured through a GPS core and network location information obtained through CDMA wireless signal measurement. In the MS-based mode, the GPS core provides a plurality of functions such as location calculation using the satellite GPS information and the location information.

As shown in FIG. 15, when a location-based service application is executed in the application area at step 1501, a device deriver notifies a CM included in the CDMA area of the terminal of the location-based service application at step 1502.

When the LTE processor is in an activated state, the CM receives cell information of LTE from the LTE area through a host interface at step 1503. Simultaneously or sequentially, the CM calls a SUPL start function using the LTE cell information as an argument at step 1504. More specifically, the SUPL start function initializes GPS modules (SUPL and IS-801 modules). The SUPL module generates SUPL data using LTE network information.

The SUPL data may be transmitted and received to and from the LTE processor using the host interface and a data protocol stack such as an IP/TCP or UDP protocol at step 1505. More specifically, when the CDMA processor has received RRLP data from the LTE processor, the RRLP data is input to an IS-801 module after being converted into IS-801 data. In addition, in the case where the CDMA processor transfers data to the LTE processor, data generated by the IS-801 module is converted into RRLP data and the SUPL module incorporates the RRLP data into SUPL data and transfers the SUPL data to the LTE processor. Further, the SUPL data may be processed into user data in the LTE processor at step 1506.

Figure 16:
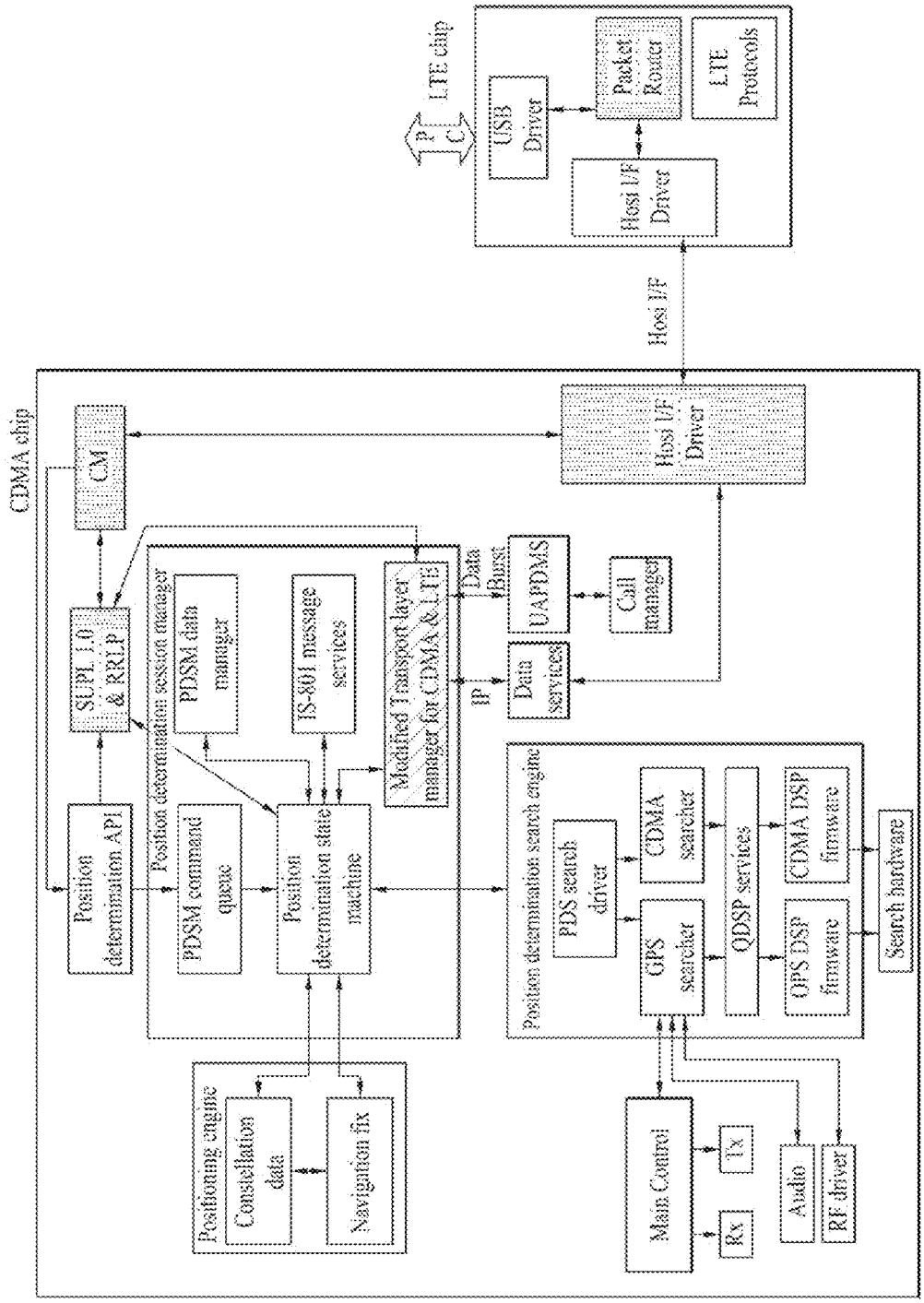
FIG. 16 is a block diagram illustrating the configuration of software modules that may be included in a dual mode terminal according to the fourth embodiment of the present invention.

FIG. 16 is a block diagram illustrating the configuration of software modules that may be included in a dual mode terminal according to the fourth embodiment of the present invention.

As can be seen from FIG. 16, not only software modules included in a conventional CDMA chip that has been commercialized but also both a Secure User Plane Location (SUPL) 1.0 & RRLP module and a modified transport layer manager for CDMA & LTE are added to a CDMA chip of FIG. 16. When the LTE area has been activated, the SUPL 1.0 and RRLP module performs functions to convert an IS-801 message into an RRLP message and generate SUPL data including the RRLP message using a 'position determination state machine' module and to transfer the SUPL data to the LTE area in order to transmit the SUPL data to the LTE network.

In addition, the 'modified transport layer manager for CDMA & LTE' module performs a function to route SUPL-related data among data received from the LTE network to the SUPL 1.0 and RRLP module and performs a function to route IS-801-related data among data received from the CDMA network to the 'position determination state machine' module.

Figure 17:
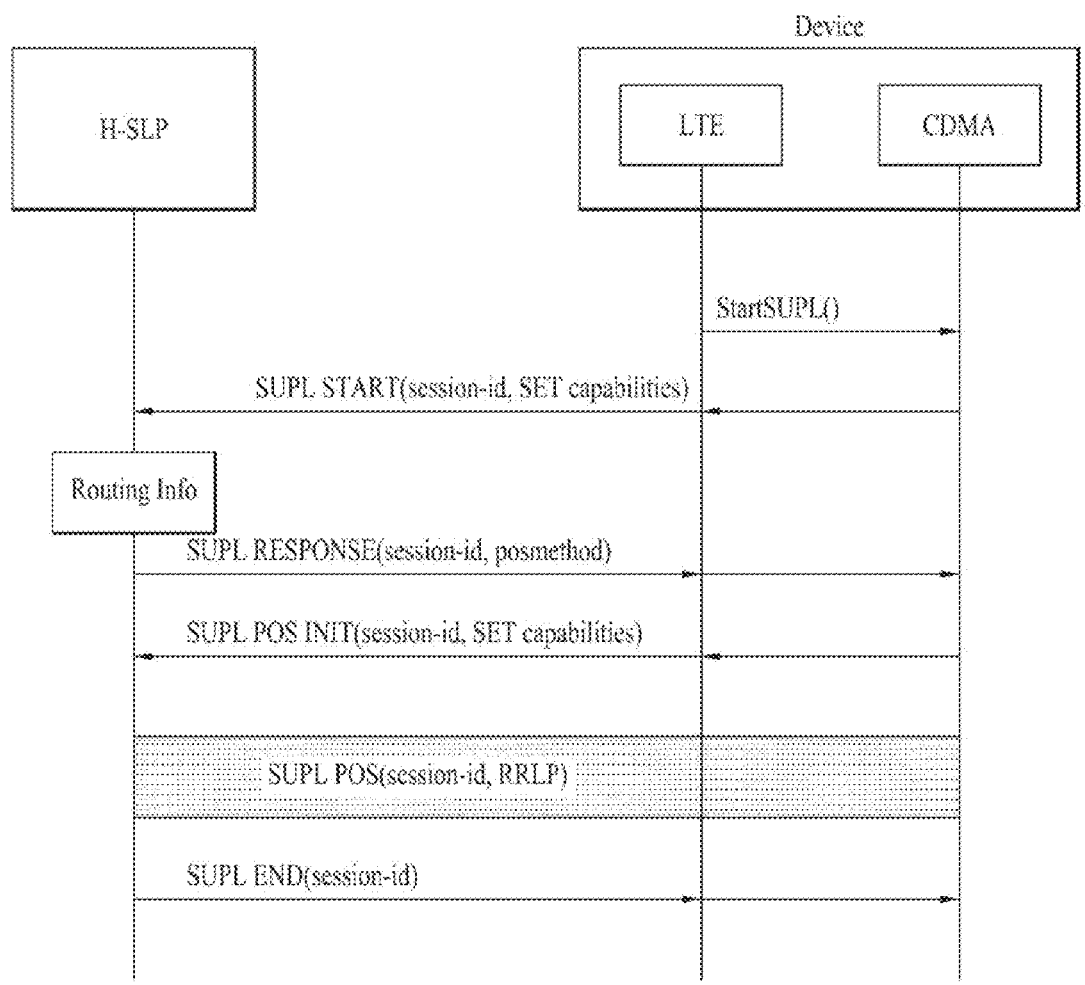
FIG. 17 is a signal flow diagram illustrating an example of a method for obtaining location information of a dual mode terminal according to the fourth embodiment of the present invention.

FIG. 17 is a signal flow diagram illustrating an example of a method for obtaining location information of a dual mode terminal according to the fourth embodiment of the present invention. In the example of FIG. 17, it is assumed that the dual mode terminal is connected to the LTE network. A detailed description of the signal flow diagram of FIG. 17 is omitted herein since it is similar to that of FIG. 14 with the only difference being that RRLP is used as a protocol for position determination.

Fifth Embodiment

Figure 18:
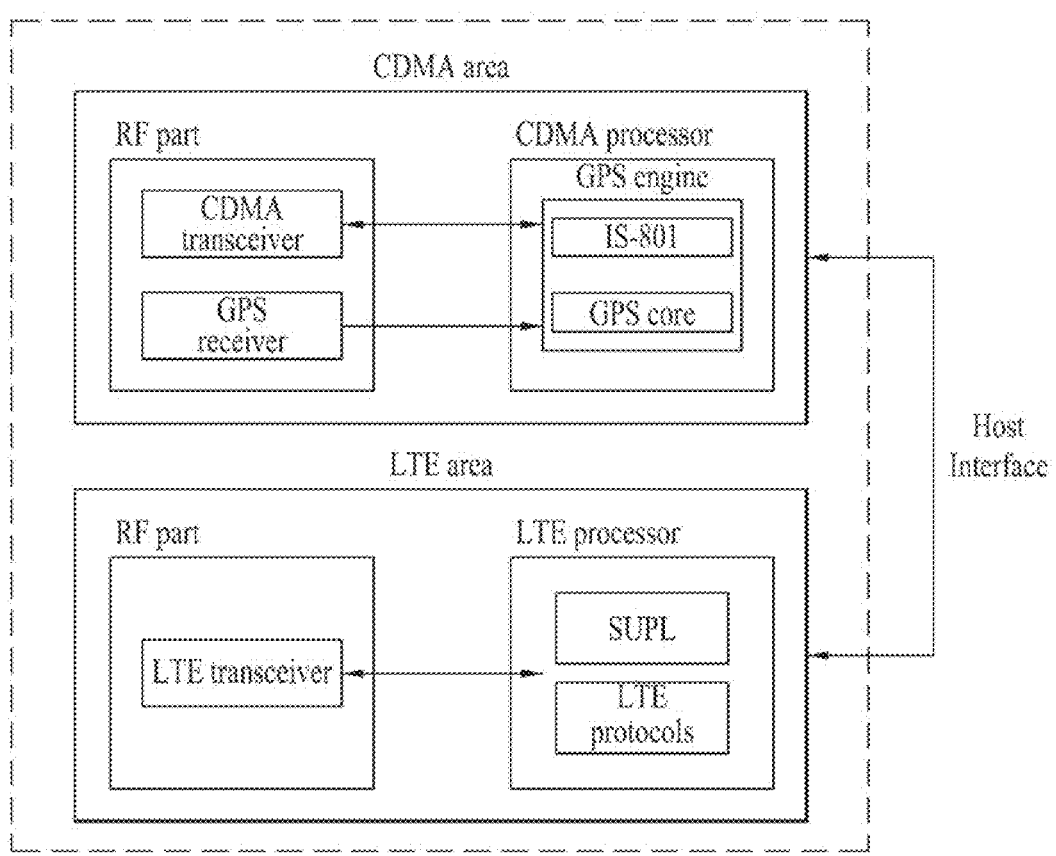
FIG. 18 is a block diagram illustrating a structure of a dual mode terminal according to a fifth embodiment of the present invention.

FIG. 18 is a block diagram illustrating a structure of a dual mode terminal according to the fifth embodiment of the present invention. Specifically, FIG. 18 illustrates a structure of a dual mode terminal which can support location-based services on both the LTE network and the CDMA network by providing a GPS receiver and a GPS core, which can be shared with an LTE area, in a CDMA area to reduce hardware complexity. The configuration of the CDMA area and the configuration of the LTE area may be swapped. That is, the GPS receiver and the GPS core, which have main functions to provide location-based services, may be included in the LTE area, instead of in the CDMA area, to support location-based services.

As shown in FIG. 18, an RF part included in the CDMA area includes a transceiver and a GPS receiver. The RF part may be constructed as an independent hardware entity or a single hardware module. The transceiver includes a transmitter and a receiver. The GPS receiver included in the CDMA processor in the CDMA area is used to receive GPS signals both when the dual mode terminal is connected to the CDMA network and when the dual mode terminal is connected to the LTE network. A host interface is provided between the CDMA area and the LTE area and can be used for transmission of control signals and data signals between the areas in order to provide location-based services.

A GPS engine included in the CDMA processor of the CDMA area includes an IS-801 module that processes a protocol responsible for communication with the CDMA network and a GPS core for GPS signal processing. The GPS engine may control the operation of the terminal both when the terminal is connected to the CDMA network and when the terminal is connected to the LTE network.

When the dual mode terminal is connected to the CDMA network, the IS-801 module provides a function for communication with the location information server through the CDMA network and the GPS core provides a plurality of functions such as location calculation for location-based services using satellite GPS signals received from the GPS receiver and network location information received from the location information server. That is, the GPS engine may determine the current position of the terminal using satellite GPS signals alone in a standalone GPS mode and may determine the current position using a combination of satellite GPS information and network location information that is received from the location information server through the CDMA network in an MS-based/MS-assisted mode.

When the dual mode terminal is connected to the LTE network, a SUPL module and LTE protocol module included in the LTE processor communicates with the location information server of the LTE network to receive network location information therefrom and transfers the received network location information to the GPS engine included in the CDMA processor through the host interface. In addition, the GPS engine included in the CDMA processor provides a function to determine the location of the terminal using satellite GPS signals received from the GPS receiver and the network location information.

Further, in this embodiment, the LTE area does not require a separate GPS engine and may receive information generated by the GPS engine included in the CDMA processor through a host interface and generate SUPL data from the received information in the SUPL module and then may communicate with the location information server of the LTE network using the LTE protocol.

That is, the GPS engine may determine the current position of the terminal using satellite GPS signals alone in a standalone GPS mode and may determine the current position using a combination of satellite GPS information and network location information that is received from the location information server through the LTE network in an MS-based/MS-assisted mode. SUPL versions that may be used in this case include version 2.0 or higher and modified version 1.0 which includes a function to access the LTE network in addition to the functions of version 1.0.

Sixth Embodiment

Figure 19:
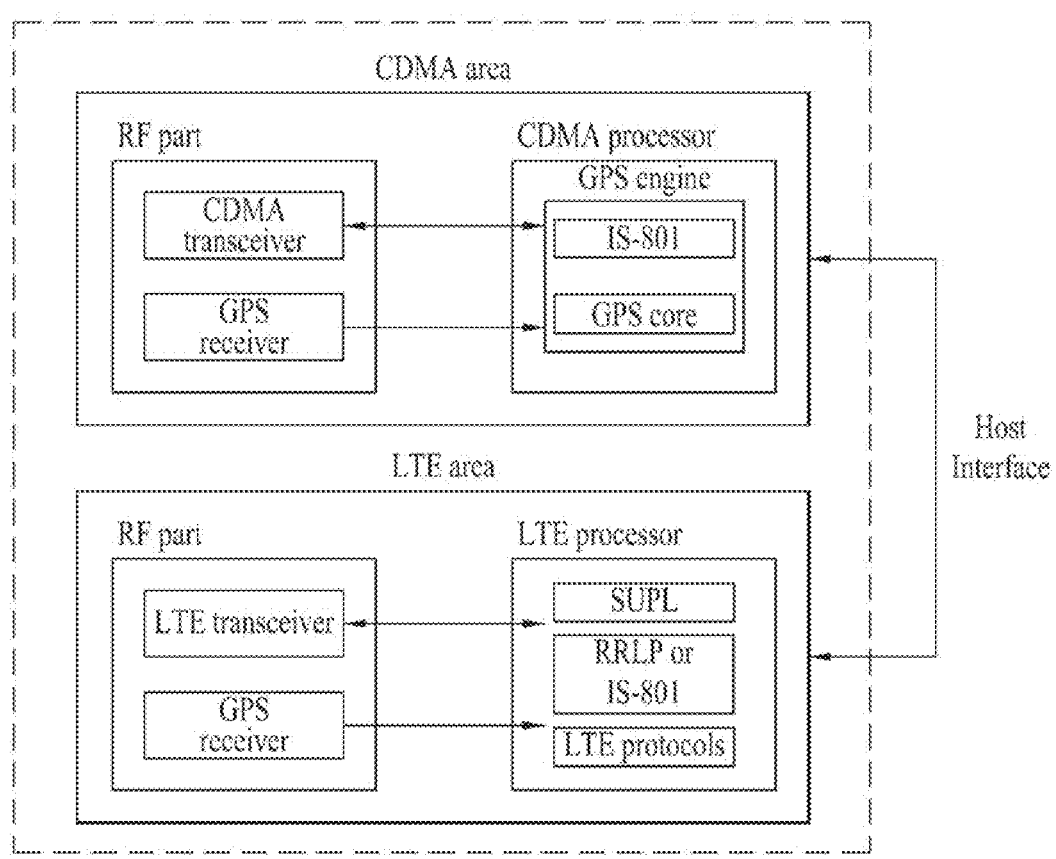
FIG. 19 is a block diagram illustrating a dual mode terminal according to a sixth embodiment of the present invention.

FIG. 19 is a block diagram illustrating a dual mode terminal according to a sixth embodiment of the present invention. Specifically, FIG. 19 illustrates a structure of a dual mode terminal in which a CDMA area and an LTE area each include a GPS receiver and a GPS core included in the CDMA area is shared with the LTE area to support location-based services on both the LTE network and the CDMA network. The configuration of the CDMA area and the configuration of the LTE area may be swapped. That is, the GPS receiver, which has main functions to provide location-based services, may be included in the LTE area, instead of in the CDMA area, to support location-based services.

As shown in FIG. 19, an RF part included in each of the LTE area and the CDMA area includes a transceiver and a GPS receiver. The RF part may be constructed as an independent hardware entity or a single hardware module. The transceiver may include a transmitter and a receiver. A host interface is provided between the CDMA area and the LTE area and can be used for transmission of control signals and data signals between the areas in order to provide location-based services. The GPS receiver included in each of the CDMA area and the LTE area is used to receive satellite GPS signals both when the dual mode terminal is connected to the CDMA network and when the dual mode terminal is connected to the LTE network.

A GPS engine included in the CDMA processor of the CDMA area may control the operation of the terminal both when the terminal is connected to the CDMA network and when the terminal is connected to the LTE network.

When the dual mode terminal is connected to the CDMA network, the IS-801 module provides a function for communication with the location information server through the CDMA network and the GPS core provides a plurality of functions such as location calculation for location-based services using satellite GPS signals received from the GPS receiver and network location information received from the location information server. That is, the GPS engine may determine the current position of the terminal using satellite GPS signals alone in a standalone GPS mode and may determine the current position using a combination of satellite GPS information and network location information that is received from the location information server through the CDMA network in an MS-based/MS-assisted mode.

When the dual mode terminal is connected to the LTE network, the GPS receiver included in the LTE area functions to receive and provide satellite GPS signals to the GPS engine of the CDMA area through the host interface. The GPS engine in the CDMA area provides a function to determine the location of the terminal using satellite GPS signals received from the LTE area and network location information received from the location information server.

On the other hand, the LTE area does not require a separate GPS engine and receives information generated by the GPS engine in the CDMA area through a host interface and generates SUPL data and provides a function to communicate with the location information server of the LTE network using one of the SUPL, RRLP, and IS-801 protocols.

That is, the GPS engine may determine the current position of the terminal using satellite GPS signals alone in a standalone GPS mode and may determine the current position using a combination of satellite GPS information and network location information that is received from the location information server through the LTE network in an MS-based/MS-assisted mode. SUPL versions that may be used in this case include version 2.0 or higher and modified version 1.0 which includes a function to access the LTE network in addition to the functions of version 1.0.

Seventh Embodiment

A seventh embodiment of the present invention relates to the case where an LTE terminal uses SUPL and RRLP protocols to provide location-based services. Here, it is to be noted that the seventh embodiment of the present invention is applied to a single mode terminal, which supports only the LTE network, rather than to a dual mode terminal which supports both the CDMA and LTE networks.

In addition, in the seventh embodiment of the present invention, the LTE chip (area) needs to support a SUPL protocol and to include an interface between the SUPL protocol and the GPS module. That is, the CDMA area (CDMA chip) may include a 'positioning determination state machine' module for supporting the RRLP protocol and may include a TCP/IP protocol stack. Further, a SUPL Location Platform (SLP) (i.e., the location information server) supports RRLP as a protocol for satellite GPS information and LTE network location information may be provided to the location information server through SUPL packets rather than through RRLP packets.

Here, since SUPL 1.0 among SUPL protocol versions does not support the LTE network, SUPL 1.0 should be modified as described above in the third embodiment. Thus, SUPL versions that may be used in this case include version 2.0 or higher and modified version 1.0 which includes a function to access the LTE network in addition to the functions of version 1.0. Due to use of such a SUPL protocol, it is possible to provide location-based services on the LTE network while minimizing change in the configuration of the conventional location-based system.

Figure 20:
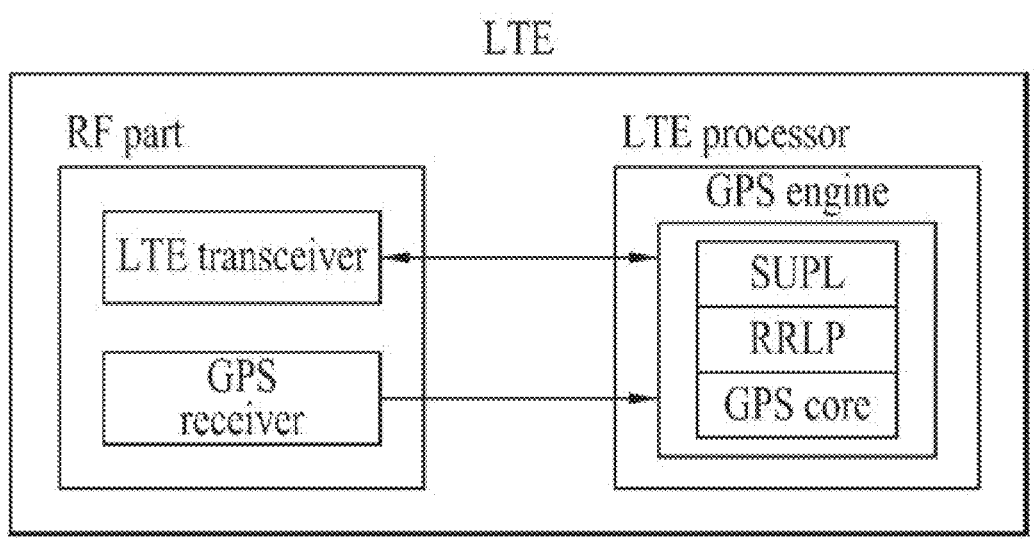
FIG. 20 is a block diagram illustrating a structure of a terminal according to a seventh embodiment of the present invention.

FIG. 20 is a block diagram illustrating a structure of a terminal according to the seventh embodiment of the present invention. Specifically, FIG. 20 illustrates a structure of a terminal for supporting location-based services on the LTE network when the terminal is connected to the LTE network.

As shown in FIG. 20, an RF part in the LTE terminal includes a transceiver and a GPS receiver. An RF part may be constructed as an independent hardware entity or a single hardware module. The transceiver may include a transmitter and a receiver. The GPS receiver is used to receive GPS signals both when the dual mode terminal is connected to the CDMA network and when the dual mode terminal is connected to the LTE network.

In addition, an IS-801 or RRLP module provides a function for communication with a location information server on the LTE network and the GPS core provides a plurality of functions such as location calculation for providing location-based services using satellite GPS signals and LTE protocols such as RRLP and SUPL or IS-801. That is, the GPS engine may determine the current position of the terminal using satellite GPS signals alone in a standalone GPS mode and may determine the current position using a combination of satellite GPS information and network location information that is received from the location information server through the LTE network in an MS-based/MS-assisted mode. SUPL versions that may be used in this case include version 2.0 or higher and modified version 1.0 which includes a function to access the LTE network in addition to the functions of version 1.0.

Figure 21:
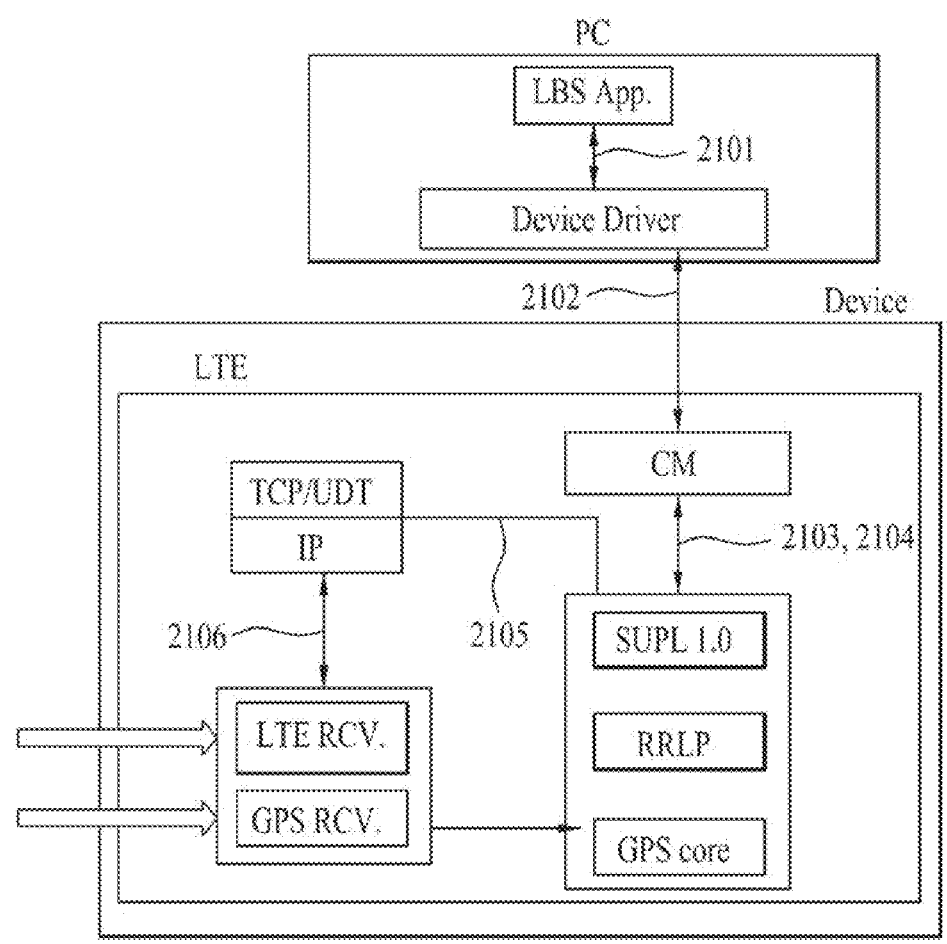
FIG. 21 illustrates an operation method of a terminal according to the seventh embodiment of the present invention.

FIG. 21 illustrates an operation method of a terminal according to the seventh embodiment of the present invention.

As shown in FIG. 21, when a location-based service application is executed in the application area at step 2101, a device deriver notifies a CM included in the CDMA area of the terminal of the location-based service application at step 2102.

The CM acquires cell information of LTE at step 2103 and calls a SUPL start function using the LTE cell information as an argument at step 2104 and generates SUPL data. The SUPL data may be transmitted and received to and from the LTE processor using a data protocol stack such as an IP/TCP or UDP protocol at step 2105 and may be processed into user data in the LTE processor at step 2106.

Figure 22:
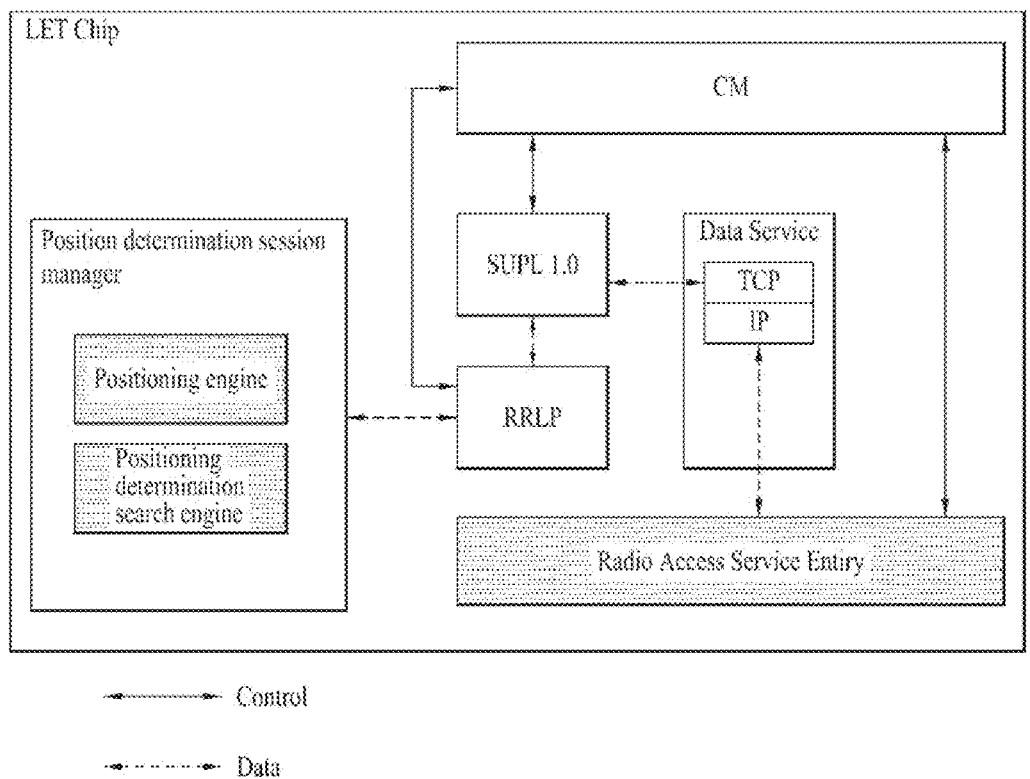
FIG. 22 is a block diagram illustrating the configuration of software modules that may be included in a terminal according to the seventh embodiment of the present invention.

FIG. 22 is a block diagram illustrating the configuration of software modules that may be included in a terminal according to the seventh embodiment of the present invention.

As can be seen from FIG. 22, a Secure User Plane Location (SUPL) 1.0 module and an RRLP module are added to an LTE chip in order to provide location-based services. The SUPL 1.0 module performs functions to generate SUPL data including an RRLP message using a 'positioning engine' module and to transfer the SUPL data to the LTE area.

Figure 23:
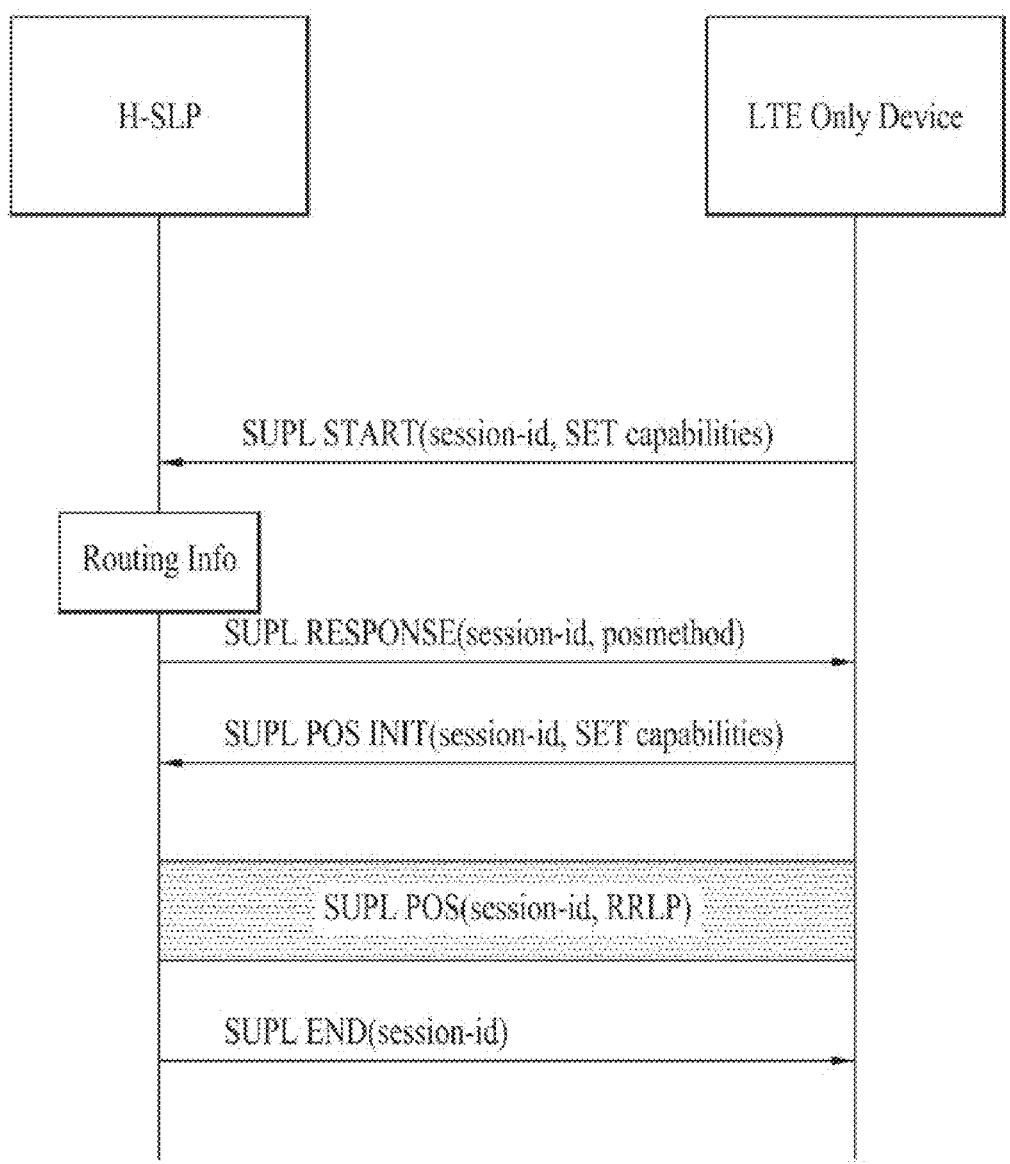
FIG. 23 is a signal flow diagram illustrating an example of a method for obtaining location information of a terminal according to the seventh embodiment of the present invention.

FIG. 23 is a signal flow diagram illustrating an example of a method for obtaining location information of a terminal according to the seventh embodiment of the present invention.

A detailed description of the signal flow diagram of FIG. 23 is omitted herein since it is similar to that of FIG. 17 with the only difference being that a procedure for transmitting and receiving a StartSUPL message instructing initialization of the SUPL module in the CDMA area is omitted since the terminal of FIG. 23 is not a dual mode terminal.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a terminal and a Base Station (BS). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

The present invention can be applied to a wireless communication system. More specifically, the present invention can be applied to a dual mode terminal, which supports location-based services, and a method for controlling the dual mode terminal.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A dual mode terminal for providing location-based services, the dual mode terminal comprising:
    a first area comprising:
        a first wireless communication unit configured to communicate with a first communication network; and
        a first processor configured to process signals transmitted to and received from the first communication network; and
    a second area comprising:
        a second wireless communication unit configured to communicate with a second communication network, and
        a second processor configured to process signals transmitted to and received from the second communication network,
    wherein:
        the first wireless communication unit comprises a Global Positioning System (GPS) receiver configured to receive satellite GPS signals;
        the second wireless communication unit does not comprise a GPS receiver;
        the first processor processes network location information received from the first communication network by using a network location information protocol of the first communication network;
        the second processor processes network location information received from the second communication network by using the network location information protocol of the second communication network;
        the first processor measures the location of the dual mode terminal by using the satellite GPS signals received by the GPS receiver and the network location information received from the first communication network when the first wireless communication unit is communicating with the first communication network; and
        the first processor transfers the received satellite GPS signals to the second processor and the second processor measures the location of the dual mode terminal by using the transferred satellite GPS signals and the network location information received from the second communication network when the second wireless communication unit is communicating with the second communication network.

2. The dual mode terminal of claim 1, wherein the second processor is further configured to process a Secure User Plane Location (SUPL) protocol.

3. The dual mode terminal according to of claim 1, wherein the network location information protocol of the first communication network is a 3rd Generation Partnership Project 2 (3GPP2) IS-801 protocol.

4. The dual mode terminal according to of claim 1, wherein the network location information protocol of the second communication network is a Radio Resource Location Services Protocol (RRLP) or a Radio Resource Control (RRC) protocol.

5. The dual mode terminal of claim 1, wherein:
    the first communication network is a Code Division Multiple Access (CDMA) communication network or a Wideband-CDMA (WCDMA) communication network and
    the second communication network is a Long Term Evolution (LTE) communication network.

6. The dual mode terminal of claim 1, further comprising an application area configured to
    determine whether the data transmitted to and received from the first and second wireless communication units area is data configured to communicate with the first communication network or the second communication network.

7. The dual mode terminal of claim 1, further comprising a host interface configured to transmit and receive data between the first processor and the second processor.

8. The dual mode terminal of claim 2, wherein the SUPL protocol is configured to ignore 1-bit information for a Closed Subscriber Group (CSG) among 29-bit cell ID information received from the second communication network.

9. A method for measuring a location of a dual mode terminal comprising a Code Division Multiple Access (CDMA) area and a Long Term Evolution (LTE) area configured to provide location-based services in a wireless communication system, the method comprising:
    receiving a satellite Global Positioning System (GPS) signal through a GPS receiver included in the CDMA area and transferring the received satellite GPS signal to a CDMA processor included in the CDMA area;
    receiving CDMA location information from a location information server connected to a CDMA network through a wireless communication unit included in the CDMA area, transferring the CDMA location information to an CDMA processor included in the CDMA area, processing the received CDMA location information by a CDMA processor using a CDMA location information protocol, measuring the location of the dual mode terminal by the CDMA processor using the received satellite GPS signal and the processed CDMA location information when the dual mode terminal is communicating with the CDMA network; and
    receiving LTE location information from a location information server connected to an LTE network through a wireless communication unit included in the LTE area, transferring the LTE location information to an LTE processor included in the LTE area, processing the transferred LTE location information by the LTE processor using an LTE location information protocol, transferring the satellite GPS signal from the CDMA processor to the LTE processor, and measuring the location of the dual mode terminal by the LTE processor using the transferred satellite GPS signal and the processed LTE location information when the dual mode terminal is communicating with the LTE network, wherein the CDMA area comprises the GPS receiver and the LTE area does not comprise a GPS receiver.

10. The method of claim 9, wherein the LTE location information protocol is a Radio Resource Location Service Protocol (RRLP) or a Radio Resource Control (RRC) protocol.

11. The method of claim 9, wherein the CDMA location information protocol is a 3rd Generation Partnership Project 2 (3GPP2) IS-801 protocol.

* * * * *